United States Patent
Takeda et al.

(10) Patent No.: US 11,798,717 B2
(45) Date of Patent: Oct. 24, 2023

(54) R-T-B BASED RARE EARTH PERMANENT MAGNET

(71) Applicant: TDK CORPORATION, Tokyo (JP)

(72) Inventors: Keiji Takeda, Tokyo (JP); Shota Miyazaki, Tokyo (JP)

(73) Assignee: TDK CORPORATION, Tokyo (JP)

(*) Notice: Subject to any disclaimer, the term of this patent is extended or adjusted under 35 U.S.C. 154(b) by 756 days.

(21) Appl. No.: 16/965,956

(22) PCT Filed: Jan. 29, 2019

(86) PCT No.: PCT/JP2019/002960
§ 371 (c)(1),
(2) Date: Jul. 29, 2020

(87) PCT Pub. No.: WO2019/151245
PCT Pub. Date: Aug. 8, 2019

(65) Prior Publication Data
US 2021/0043343 A1    Feb. 11, 2021

(30) Foreign Application Priority Data

Jan. 30, 2018 (JP) ................. 2018-013722
Jan. 30, 2018 (JP) ................. 2018-013728

(51) Int. Cl.
*H01F 7/02* (2006.01)
*H01F 1/057* (2006.01)
*C22C 38/00* (2006.01)

(52) U.S. Cl.
CPC ......... *H01F 1/0577* (2013.01); *C22C 38/005* (2013.01)

(58) Field of Classification Search
CPC ...... H01F 1/0577; C22C 38/005; Y02T 10/64
(Continued)

(56) References Cited

U.S. PATENT DOCUMENTS 5,122,443 A * 6/1992 Takeda .................. G03F 7/0285
                                                      430/278.1
2015/0303744 A1   10/2015 Hashimoto et al.
(Continued)

FOREIGN PATENT DOCUMENTS

DE    10 2017 115 769 A1    1/2018
DE    10 2017 115 791 A1    1/2018
(Continued)

OTHER PUBLICATIONS

Apr. 2, 2019 International Search Report issued in International Patent Application No. PCT/JP2019/002960.
(Continued)

*Primary Examiner* — Shawki S Ismail
*Assistant Examiner* — Lisa N Homza
(74) *Attorney, Agent, or Firm* — Oliff PLC

(57) ABSTRACT

An R-T-B-based rare earth permanent magnet in which the composition formula is represented by $(R1_{1-x-y}Sm_xR2_y)_aT_bB_cM_d$, wherein: R1 is one or more rare earth elements not including Sm and Y; R2 is one or more rare earth elements from among Y, Ce, and La; T is Fe, etc.; M is Ga, etc.; x and y are in the region indicated in FIG. 1; the relationships $0.16 \leq a/b \leq 0.28$, $0.050 \leq c/b \leq 0.075$, and $0.005 \leq d/b \leq 0.028$ are satisfied; the R-T-B-based rare earth permanent magnet includes a grain boundary phase and a main phase comprising an $R_2T_{14}B$ compound; the average crystal grain diameter of the main-phase crystal grains is $D50 \leq 4.00$ μm; the granularity distribution is $(D90-D10)/D50 \leq 1.60$; and the coverage of the grain boundary phase is at least 70.0%.

6 Claims, 7 Drawing Sheets

(58) Field of Classification Search
USPC .......................................................... 335/302
See application file for complete search history.

(56) References Cited

U.S. PATENT DOCUMENTS

| | | | | |
|---|---|---|---|---|
| 2018/0040399 A1* | 2/2018 | Miyazaki | ............... | C22C 38/005 |
| 2018/0040400 A1* | 2/2018 | Takeda | ................... | C22C 38/14 |
| 2018/0047488 A1 | 2/2018 | Tomono et al. | | |
| 2018/0294079 A1* | 10/2018 | Takeda | ................... | H01F 1/057 |
| 2018/0294080 A1* | 10/2018 | Miyazaki | ................ | H01F 1/057 |

FOREIGN PATENT DOCUMENTS

| | | |
|---|---|---|
| JP | 359-46008 A | 3/1984 |
| JP | 2010-034522 A | 2/2010 |
| JP | 2010-045068 A | 2/2010 |
| JP | 2010-114371 A | 5/2010 |
| JP | 2015-207662 A | 11/2015 |
| WO | 2016/175332 A1 | 11/2016 |

OTHER PUBLICATIONS

Aug. 4, 2020 International Preliminary Report on Patentability issued in International Application No. PCT/JP2019/002960.

* cited by examiner

R-T-B BASED RARE EARTH PERMANENT MAGNET

TECHNICAL FIELD

The present invention relates to an R-T-B based rare earth permanent magnet.

BACKGROUND

An R-T-B based rare earth permanent magnet having a tetragonal $R_2T_{14}B$ compound (R represents a rare earth element and T represents Fe or Fe partially substituted by Co) as a main phase is known to have excellent magnetic properties. Since the invention in 1984 (Patent Document 1: Patent Application No. S59-46008), it has been a representative high-performance permanent magnet.

The R-T-B based rare earth permanent magnet in which R is Nd, Pr, Dy, Ho, and Tb has a large anisotropy field Ha thus it is a preferable permanent magnet material. Among these, an Nd—Fe—B based magnet in which Nd is used as the rare earth element R is widely used since it is well-balanced between a saturation magnetization Is, Curie temperature Tc, and an anisotropy field Ha; and also it is better in terms of resources and a corrosion resistance compared to an R-T-B based permanent magnet using other rare earth element R.

A permanent magnet synchronous motor is used as a power unit of a consumer, industrial, and transportation equipment. However, in the permanent magnet synchronous motor in which a magnetic field of a permanent magnet is constant, an induced voltage increases as a rotational speed becomes faster, thus the permanent magnet synchronous motor becomes difficult to drive. Thus, in a medium or high-speed range and under light load, a method called a field weakening control is applied to the permanent magnet synchronous motor. In the field weakening control, a magnetic flux of the permanent magnet is cancelled by a demagnetization field due to an armature current and an interlinkage magnetic flux is decreased; thereby the induction voltage is prevented from becoming equal or higher than a power supply voltage. However, an armature current which does not contribute to a motor output is continuously applied to keep applying the demagnetization field, hence as a result, efficiency of the motor is decreased.

In order to solve such problem, as shown in Patent Document 2, a variable magnetic force motor is developed using a low coercivity Sm—Co based permanent magnet (variable magnetic flux magnet) in which magnetization changes reversibly by applying external magnetic field. In the variable magnetic force motor, by reducing the magnetization of the variable magnetic flux magnet in a middle and high speed range and under a light load, a decrease in motor efficiency which is caused by a conventional field weakening control can be suppressed.

However, the Sm—Co based permanent magnet disclosed in Patent Document 2 is high cost since Co as a main raw material is expensive. Therefore, the R-T-B based permanent magnet is considered as a permanent magnet for variable magnetic flux magnet.

Patent Document 3 discloses an R-T-B based variable magnetic flux magnet including a main phase grain represented by a compositional formula $(R1_{1-x}R2_x)_2T_{14}B$ (R1 is at least one rare earth element not including Y, La, and Ce; R2 is one or more rare earth elements selected from Y, La, and Ce; T is one or more transition metals essentially including Fe or a combination of Fe and Co, and $0.1 \le x \le 0.5$ is satisfied) and further including 2 at % to 10 at % of M (M is at least one selected from Al, Cu, Zr, Hr, and Ti). This R-T-B based variable magnetic flux magnet has a higher remanence than the conventional Sm—Co based permanent magnet for variable magnetic force motor, thus a higher output and a higher efficiency of the variable magnetic motor are expected.

Patent Document 4 discloses an Sm—R-T-B-M based sintered magnet. R represents one or more rare earth elements essentially including Y and excluding Sm; T represents Fe or a combination of Fe and Co; and M represents elements such as Ga and Zr. Patent Document 4 discloses that this Sm—R-T-B-M based sintered magnet has an excellent re-magnetization property.

Patent Document 5 discloses a permanent magnet expressed by a compositional formula $(R1_{1-x-y}R2_xR3_y)_aFe_bCo_cB_dM_eX_fC_g$. R1 represents at least one selected from Nd and Pr; R2 represents at least one selected from Sm, La, and Ce; and R3 represents at least one selected from Tb and Dy. Also, M represents elements such as Ti and the like, and X represents elements such as Ga and the like. Patent Document 4 discloses that this permanent magnet can change a magnetization state and has a low coercivity.

[Patent Document 1] JP Patent Application Laid Open No. S59-46008
[Patent Document 2] JP Patent Application Laid Open No. 2010-34522
[Patent Document 3] JP Patent Application Laid Open No. 2015-207662
[Patent Document 4] JP Patent Application Laid Open No. 2010-114371
[Patent Document 5] JP Patent Application Laid Open No. 2010-45068

SUMMARY

Usually, when an R-T-B based rare earth permanent magnet is magnetized, a magnetic field is applied which is about three times or so of a coercivity of the magnet in order to attain a high magnetic flux density and a high coercivity.

On the other hand, a variable magnetic force motor can be rotated with a high efficiency in a wide speed range by switching a magnetization state of a variable magnetic flux magnet according to a minor curve of a magnetization curve by a magnetic field of an armature and the like while the variable magnetic flux magnet is built in the motor. Here, the minor curve refers to a magnetization variable behavior when magnetizing at a positive magnetic field Hmag then applying a reverse magnetic field Hrev and sweeping back to the magnetic field Hmag.

A magnetization is switched by applying a magnetic field from an armature and the like, thus it is necessary to decrease the magnetizing field Hmag needed for switching of the magnetization, in view of an upper limit of the magnetic field which can be applied in the motor due to energy conservation and inverter capacity. Thus, first, a coercivity of the variable magnetic flux magnet needs to be low.

Also, in order to widen a high efficiency driving range, a variation amount of magnetization between at the operating point in the magnetization state and at that in the demagnetization state of the variable magnetic flux magnet in the motor needs to be increased. Therefore, a squareness ratio of the magnetization curve needs to be high. Also, when the magnetic field is swept from a reverse magnetic field Hrev to a magnetic field Hmag in a minor curve, magnetization preferably does not change as much as possible until the magnetic field becomes close to Hmag, that is from second and third quadrants to first and fourth quadrants. Hereinafter, such preferable condition is referred to as a condition where a minor curve flatness is high.

Further, in the variable magnetic force motor, a continuously variable magnetization is expected which involves successive magnetization and demagnetization from a certain partial magnetization state to another partial magnetization state. Even if a minor curve flatness is high at the second and third quadrants, when the minor curve flatness is low at the first and fourth quadrants, it becomes difficult to be magnetized to a desired state when successive magnetization is performed. In order to control the continuously variable magnetization, a minor curve flatness needs to be high from the second and third quadrants to the first and fourth quadrants.

As mentioned in above, in case of a usual R-T-B based rare earth permanent magnet, the magnet is magnetized by a magnetic field 3 times or more as large as its coercivity, then magnetic properties such as a remanence, a coercivity, and the like are evaluated. Therefore, in case the magnetizing field is as small as the coercivity, the magnetic properties are not evaluated.

The present inventors have evaluated the magnetic properties of the R-T-B based rare earth permanent magnet, when the magnetizing field is as small as its coercivity. The present inventors have found that when the magnetizing field decreases, the squareness ratio of the minor curve and the minor curve flatness deteriorate. That is, the present inventors have found that the squareness ratio of the minor curve and the minor curve flatness are influenced by a magnitude of magnetizing field.

For example, regarding samples according to Patent Document 3, it was found that when the magnetizing field is decreased, even if it was the same sample, a shape of a hysteresis curve changed as shown in FIG. 6A and FIG. 6B. FIG. 6A shows a hysteresis curve when the magnetizing field is 30 kOe, and FIG. 6B shows a hysteresis curve when the magnetizing field is 10 kOe. As apparent from FIG. 6A and FIG. 6B, when the magnetizing field changes, a shape of the hysteresis curve drastically changes.

When FIG. 6A and FIG. 6B are compared, a squareness ratio of the hysteresis curve and the minor curve flatness of FIG. 6B are deteriorated compared to a squareness ratio of the hysteresis curve and the minor curve flatness of FIG. 6A. That is, when the magnetizing field decreases, the squareness ratio and the minor curve flatness tend to lower. Also, the squareness ratio of the hysteresis curve shown in FIG. 6A is relatively good, yet the minor curve flatness is as low as that in FIG. 6B.

Therefore, the R-T-B based rare earth permanent magnet according to Patent Document 3 has a low coercivity, but the minor curve flatness is low even under saturated magnetization state (FIG. 6A); and when the magnetizing field is lower (FIG. 6B), the minor curve flatness is further lower and the squareness ratio also decreases. As a result, for the variable magnetic force motor using the R-T-B based rare earth permanent magnet according to Patent Document 3 as a variable magnetic flux magnet, it was not possible to widen a high efficiency driving range. In other words, the properties needed for a magnet suitable as the variable magnetic flux magnet are, in addition to a low coercivity, good squareness ratio and minor curve flatness even when the magnetizing field is low.

Further, the variable magnetic flux magnet installed in the variable magnetic force motor may be exposed under a high temperature environment such as 100° C. to 200° C. while operating the motor. Thus, a rate of decrease of the coercivity and a rate of decrease of the minor curve flatness at high temperature are preferably low. In regards to that point, the invention of Patent Document 3 only ensures the magnetic properties at room temperature, and the rate of decrease of the coercivity and the rate of decrease of the minor curve flatness at high temperature are significantly large and a motor may be inoperable due to a irreversible demagnetization of the magnet.

The present inventors have also examined an R-T-B based rare earth permanent magnet according to the invention of Patent Document 4, and it was found that when the magnetizing field is low, the squareness ratio and the minor curve flatness deteriorate. Further, the present inventors have found that the squareness ratio and the minor curve flatness also deteriorated under high temperature environment.

Further, in case of Patent Document 5, when the magnetizing field is 10 kOe, the minor curve flatness in the second and third quadrants is good, but the minor curve flatness in the first and fourth quadrants is not evaluated. In case the minor curve flatness at the first and fourth quadrants is low, the magnetization becomes uncontrollable since a reverse magnetic field to carry out successive magnetization cannot be specified.

Also, the squareness ratio Mr/Ms (Mr represents a residual magnetic flux and Ms represents a magnetization at 10 kOe) in the first quadrant after magnetization is good, but the squareness ratio Hk/HcJ (Hk represents a value of a magnetic field at which a magnetization is 90% of Mr) in the second quadrant is not evaluated. An operating point of the variable magnetic flux magnet in the variable magnetic force motor is usually in a second quadrant. In case the squareness ratio in the second quadrant is low, a variation amount of magnetization between in the magnetization state and in the demagnetization state becomes small, thus a high efficiency driving range cannot be widened. Further, the invention of Patent Document 5 also only ensures the magnetic properties at room temperature.

The present inventors have also examined an R-T-B based rare earth permanent magnet according to the invention of Patent Document 5, and have found that the squareness ratio and the minor curve flatness deteriorated when magnetized in a low magnetizing field. Also, the present inventors have found that the coercivity and the minor curve flatness deceases not only when magnetized in a low magnetizing field but also decrease under high temperature environment.

The present invention is attained in view of such circumstances. The object of the present invention is to provide an R-T-B based rare earth permanent magnet suitable for the variable magnetic force motor capable of maintaining a high efficiency at a wide rotational speed range, having a high remanence, a low coercivity, and also having high squareness ratio and minor curve flatness even after magnetized in a low magnetizing field.

An R-T-B based rare earth permanent magnet has a nucleation-type magnetization reversal mechanism. Therefore, a movement of a magnetic domain wall is easily generated according to an external magnetic field. Thereby the magnetization greatly changes. Thus, when the magnetizing field is low, a squareness ratio and a minor curve flatness are also lowered. In general, for the R-T-B based rare earth permanent magnet, in order to be increased in squareness ratio and minor curve flatness after magnetized in a low magnetizing field, it is effective to be increased in coercivity. Thus, for the R-T-B based rare earth permanent magnet, a low coercivity and high squareness ratio and minor curve flatness after magnetized in a low magnetizing field are difficult to be attained at the same time.

However, as a result of a keen examination, the present inventors have found that a low coercivity and high squareness ratio and minor curve flatness after magnetized under a low magnetizing field can be attained at the same time by examining a composition which can attain a low coercivity; and by examining microstructure leading to uniformity of nucleation field of reverse magnetic domain and stabilization of a single domain structure under a magnetic field for each grain included in the R-T-B based rare earth permanent magnet.

In order to solve the above-mentioned problems and to attain the objects, the present invention is an R-T-B based rare earth permanent magnet represented by a compositional formula of $(R1_{1-x-y}Sm_xR2_y)_aT_bB_cM_d$, wherein R1 represents one or more rare earth elements which does not include Sm and R2, R2 represents one or more rare earth elements selected from Y, Ce, and La, T represents one or more transition metals essentially including Fe or a combination of Fe and Co, M represents Ga or a combination of Ga and one or more elements selected from Sn, Bi, and Si, x and y are on straight lines or in a pentagonal area surrounded by the straight lines formed by connecting point A (0.010, 0.600), point B (0.010, 0.400), point C (0.050, 0.000), point D (0.150, 0.000), and point E (0.100, 0.600) on (x, y) plane, a, b, c, and d satisfy relationships of $0.16 \leq a/b \leq 0.28$, $0.050 \leq c/b \leq 0.075$, and $0.005 \leq d/b \leq 0.028$, the R-T-B based rare earth permanent magnet includes grain boundary phases and a main phase including a compound having an $R_2T_{14}B$ based tetragonal structure, an average grain size D50 of main phase crystal grains of the main phase satisfies a relationship of D50≤4.00 μm, a grain size distribution satisfies a relationship of (D90−D10)/D50≤1.60, in which D10, D50, and D90 respectively represent an area circle equivalent diameter at 10%, 50%, and 90% in a cumulative distribution of a cross sectional area of the main phase crystal grains in an cross section of the R-T-B based rare earth permanent magnet, and a grain boundary phase coverage is 70.0% or more.

The R-T-B based rare earth permanent magnet according to the present invention attains a low coercivity by satisfying the above-mentioned compositional range; and particularly by substituting Sm or Sm and R2 for the rare earth element R1 included in the main phase (hereinafter, it may be mentioned as an $R_2T_{14}B$ phase) made of a compound having $R_2T_{14}B$ type tetragonal structure (hereinafter, it may be referred as an $R_2T_{14}B$ compound). The $Sm_2T_{14}B$ compound has an in-plane anisotropy which is different from a uniaxial anisotropy of the $R1_2T_{14}B$ compound including the rare earth element R1 (such as Nd, Pr, Tb, Dy, and Ho) included in the main phase, thus a strong anisotropy field originated from the $R1_2T_{14}B$ compound can be dramatically lowered by a small amount of the $Sm_2T_{14}B$ compound. Also, the anisotropy field of the $R2_2T_{14}B$ compound including the rare earth element R2 (Y, Ce, La) included in the main phase is weaker than the anisotropy field of the $R1_2T_{14}B$ compound. Further, when a compositional atomic ratio of Sm and a compositional atomic ratio of R2 with respect to a total compositional atomic ratio of the rare earth elements are within the range shown in FIG. 1, the R-T-B based rare earth permanent magnet according to the present invention achieves a low coercivity and also suitable magnetic properties as a variable magnetic flux magnet.

When a proportion of a compositional atomic ratio of B with respect to a compositional atomic ratio of the transition metal element T; and a proportion of a compositional atomic ratio of the element M (Ga or a combination of Ga and one or more selected from Sn, Bi, and Si) with respect to a compositional atomic ratio of the transition metal T are within the above-mentioned compositional range, a structure including the grain boundary phases and the main phase crystal grain made of a compound having the $R_2T_{14}B$ type tetragonal structure can be obtained.

The average crystal grain size of the main phase crystal grains of the present invention is D50≤4.00 The grain size distribution satisfies (D90−D10)/D50≤1.60 (note that, D10, D50, and D90 respectively represent an area circle equivalent diameter at 10%, 50%, and 90% in a cumulative distribution of a cross sectional area of the main phase crystal grains in a cross section of the R-T-B based rare earth permanent magnet). Further, when a grain boundary coverage surrounding the main phase crystal grains is 70% or more, the coercivity can be maintained low, and the squareness ratio and the minor curve flatness after magnetized in a low magnetizing field can be high.

The present inventors examined to increase the squareness ratio and the minor curve flatness after magnetized in a low magnetizing field of the R-T-B based rare earth permanent magnet having the nucleation-type magnetization reversal mechanism. As a result, when a magnetization of the magnet during demagnetizing process is kept constant until the magnetic field becomes close to the negative coercivity after magnetized in a positive magnetic field Hmag, the squareness ratio was confirmed to be high. In addition, when a magnetization of the magnet during a remagnetizing process is kept constant until the magnetic field becomes close to the positive coercivity after demagnetized in a reverse magnetic field Hrev, the minor curve flatness is confirmed to be high.

In order to keep the magnet magnetization constant during the demagnetizing process after magnetized in a positive magnetic field Hmag and during the magnetizing process after magnetized in a reverse magnetic field Hrev, it is effective that the main phase crystal grain included in the R-T-B based rare earth permanent magnet becomes a single domain state after magnetized in a low magnetizing field Hmag, and the single domain state once formed is stable. Also, it is effective that a dispersion of the nucleation field of reverse magnetic domain is reduced. Supposing the main phase crystal grain is in a multidomain state, the magnetic domain wall moves freely according to the change of the magnetic field during the demagnetizing process and the magnetizing process because no pinning site exists in the main phase crystal grain. Therefore, the magnetization of the magnet is not kept constant.

Also, when the dispersion of the nucleation field of reverse magnetic domain of each main phase crystal grain is large, the magnetization of each main phase crystal grain is reversed at varied values of the magnetic field during the demagnetizing process and the magnetizing process. Therefore, the magnetization of the whole magnet is not kept constant.

In order to realize the single domain state after magnetized in a low magnetizing field Hmag, it is necessary to decrease the local demagnetization field. However, a large demagnetization field is applied locally to the main phase crystal grain in a general R-T-B based rare earth permanent magnet. Therefore, an intensity of the magnetizing field Hmag needs to be about 3 times or so of the coercivity in order to make the main phase crystal grains entirely in the single domain state.

The local demagnetization field increases for example by direct contact between main phase crystal grains adjacent to each other and by edges generated on the surfaces of main phase crystal grains as the main phase crystal grain is not coated by the grain boundary phase.

Therefore, by making a rate of the main phase crystal grains covered by the grain boundary phase (a grain boundary phase coaverage) 70.0% or more, the local demagnetization field can be reduced, and the single domain state can be realized in the low magnetizing field Hmag.

In order to stabilize the single domain state after magnetized, it is extremely important to control a grain size of the main phase crystal grain, from the point of a balance between a magnetostatic energy and a magnetic domain wall energy. According to the present invention, by setting an average crystal grain size of the main phase crystal grains to D50≤4.00 μm, the single domain structure after magnetized can be stabilized. In addition, the present inventors have found that the dispersion of the nucleation field of reverse magnetic domain can be reduced by making the grain size distribution dispersion of the main phase crystal grains satisfy (D90−D10)/D50≤1.60, since the nucleation field of reverse magnetic domain is associated with the grain size of the main phase crystal grain.

In addition, even when the average grain size and the grain size distribution dispersion of the main phase crystal grains are controlled as mentioned above, if number of places where the adjacent main phase crystal grains are magnetic exchange-coupled with each other increases, this situation is magnetically equivalent to a situation in which many main phase crystal grains with large grain size exist. Thus, this situation can be considered as having a large dispersion of the grain size distribution. Consequently, the single domain state after magnetized is destabilized, and the dispersion of the nucleation field of reverse magnetic domain becomes large. The present inventors have found that, the present composition enables 70% or more of the outer circumference of the main phase crystal grain to be coated by the grain boundary phases with a thickness of 3 nm or more, enough to cut the magnetic exchange-coupling between the main phase crystal grains. As a result, the single domain state of the main phase crystal grain is stabilized and the dispersion of the nucleation field of reverse magnetic domain can be decreased.

For the reasons above, when the average grain size, the grain size distribution, and the grain boundary phase coverage of the main phase crystal grains satisfy the above relations, the squareness ratio and the minor curve flatness after magnetized in a low magnetizing field can be increased.

According to the present invention, an R-T-B based rare earth sintered magnet suitable for a variable magnetic flux motor capable of maintaining a high efficiency in a wide rotational speed range and also having a high remanence, a low coercivity, and remarkably high squareness ratio and minor curve flatness after magnetized in a low magnetizing field can be provided. Note that, the R-T-B based rare earth sintered magnet according to the present invention can be applied to rotary machines in general such as generators and the like other than a variable magnetic force motor.

DETAILED DESCRIPTION

Hereinafter, the present invention will be described in detail based on embodiments. The present invention is not limited to the embodiments below. Also, constitutional elements described below include, those which can be easily attained by persons skilled in the art and those substantially identical. Further, the constitutional elements described below can be suitably combined.

A compositional formula of the R-T-B based rare earth permanent magnet according to the present invention is represented by $(R1_{1-x-y}Sm_xR2_y)_aT_bB_cM_d$. Also, the R-T-B based rare earth permanent magnet includes grain boundary phases and a main phase including a compound having $R_2T_{14}B$ type tetragonal structure ($R_2T_{14}B$ compound).

In the above-mentioned compositional formula of the present embodiment, R1 is one or more rare earth elements which does not include Sm and R2. Therefore, the $R_2T_{14}B$ compound is constituted by an $R1_2T_{14}B$ compound, an $Sm_2T_{14}B$ compound, and an $R2_2T_{14}B$ compound. A compositional atomic ratio of R1 is shown by 1-x-y in which x represents the compositional atomic ratio of Sm and y represents the compositional atomic ratio of R2 in a total compositional atomic ratio of the entire rare earth elements in the above-mentioned compositional formula. The $Sm_2T_{14}B$ compound and the $R2_2T_{14}B$ compound are components which weaken anisotropy field of the $R1_2T_{14}B$ compound such as $Nd_2T_{14}B$ compound. Therefore, by substituting Sm and R2 for R1, that is by making x and y within a predetermined range, a low coercvity of the magnet can be attained.

The $Sm_2T_{14}B$ compound has an in-plane anisotropy which is different from a weak uniaxial anisotropy of the $R2_2T_{14}B$ compound, thus the $Sm_2T_{14}B$ compound has higher potential to weaken the anisotropy field of the $R1_2T_{14}B$ compound. Also, the $Sm_2T_{14}B$ compound and the $R2_2T_{14}B$ compound contribute differently to the magnetic properties other than a coercivity.

Figure 1:
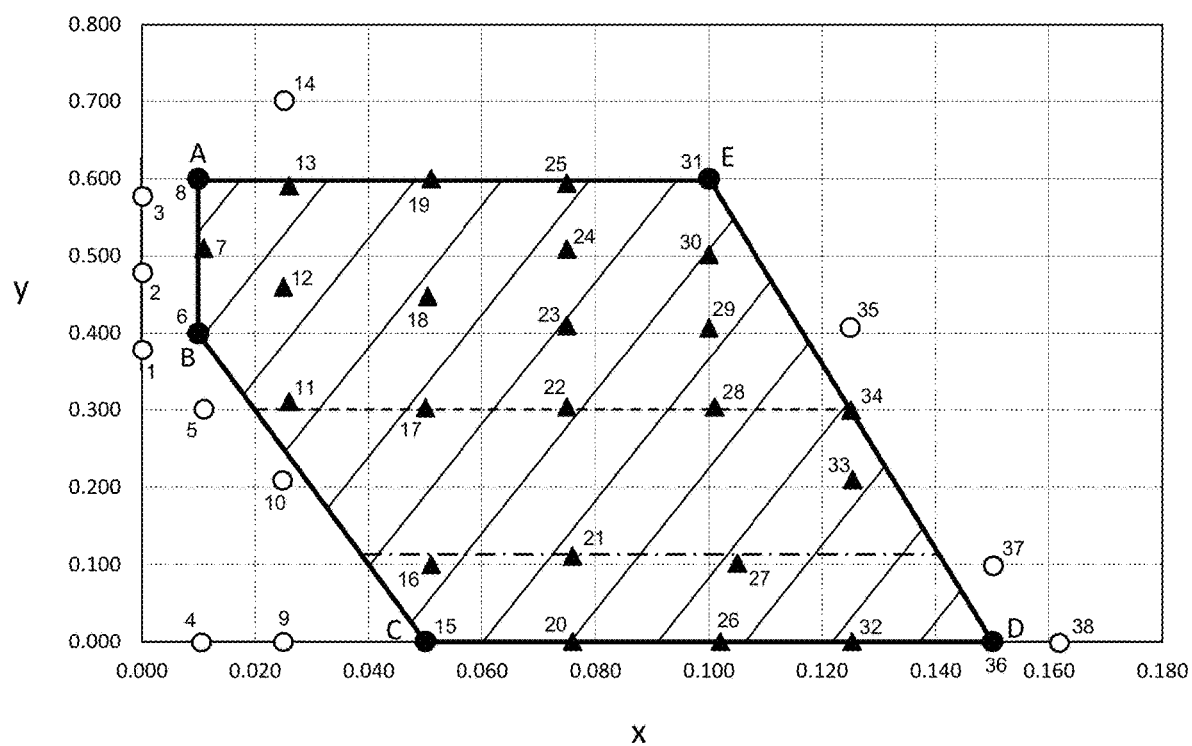
FIG. 1 is a graph showing a relationship between a compositional atomic ratio of Sm and a compositional atomic ratio of R2 with respect to a total compositional atomic ratio of the rare earth elements included in the R-T-B based rare earth permanent magnet of the present invention.

Further, in the present embodiment, x and y are controlled to be on straight lines formed by connecting point A (0.010, 0.600), point B (0.010, 0.400), point C (0.050, 0.000), point D (0.150, 0.000), and point E (0.100, 0.600) shown in FIG. 1. Also, x and y may be also controlled to be in an area surrounded by the straight lines (the area shown by slanted lines in FIG. 1). By having x and y within an area shown in FIG. 1, a low coercivity of the magnet is attainted and also suitable magnetic properties can be obtained.

Also, when the element included in the above-mentioned R1 is used as R, a temperature dependence of the anisotropy field of the R-T-B based compound shows a large monotonic decrease at high temperature. That is, the coercivity decreases drastically at high temperature.

On the other hand, in case Sm is used as R, as the temperature increases from room temperature, a contribution to weaken the anisotropy field approaches to zero, thus an effect to decrease the coercivity is weakened. Also, when the element included in R2 is used, a temperature dependence of the anisotropy field is flat compared to R1, thus an effect to decrease the coercivity is weakened at high temperature.

Therefore, by combining the element included in R1 and Sm and/or R2 as R, the squareness ratio and the minor curve flatness after magnetized in a low magnetizing field can be increased; and in addition to this, the coercivity at high temperature is suppressed from lowering. That is, a rate of decrease of the coercivity at high temperature is smaller than a rate of decrease of the coercivity in case R1 is only used as R.

Due to the above-mentioned reasons, by increasing a ratio of Sm and R2 in the rare earth elements included in the R-T-B based rare earth permanent magnet according to the preset invention, the rate of decrease of the coercivity and the rate of decrease of the minor curve flatness at high temperature can be lowered.

Also, in the range shown in FIG. 1, by limiting a compositional atomic ratio (y) of R2, part of magnetic properties suitable for the variable magnetic flux magnet can be improved even more. For example, in the range shown in FIG. 1, in case y≥0.300 is satisfied (area above the dotted line of FIG. 1), the squareness ratio Hk/Hcj after magnetized in a low magnetizing field can be particularly enhanced.

Also, in the range shown in FIG. 1, when 0.000≤y≤0.111 is satisfied, the minor curve flatness after magnetized in a low magnetizing field and the remanence Br can be particularly enhanced.

In the present embodiment, in order to obtain the coercivity suitable for the variable magnetic flux magnet based on balance of a compositional ratio between R1 with Sm and R2, the rare earth element R1 is preferably one or more of Nd, Pr, Dy, Tb, and Ho which have a high anisotropy field. More preferably, R1 is one or more of Nd and Pr. Particularly, from the point of a corrosion resistance, Nd is preferable. Note that, the rare earth element may include impurities which are derived from the raw material.

The R-T-B based rare earth permanent magnet according to the present embodiment may include Fe or other transition metal elements in addition to Fe as the transition metal element T in a basic composition of the $R_2T_{14}B$ phase. As the transition metal, Co is preferable. In this case, a content of Co is preferably 1.0 at % or less. By including Co in the rare earth magnet, Curie temperature increases and the corrosion resistance improves.

In the present embodiment, a ratio a/b which is the compositional atomic ratio of the rare earth element R with respect to the compositional atomic ratio of the transition metal element T satisfies 0.16≤a/b≤0.28.

In case a/b is less than 0.16, the $R_2T_{14}B$ phase included in the R-T-B based rare earth permanent magnet is not generated sufficiently. Thus, the T-rich phase showing a soft magnetism is formed and the grain boundary between the adjacent main phase crystal grains (intergranular grain boundary) with a thickness of 3 nm or more, enough to cut the magnetic exchange-coupling, cannot be formed. Therefore, the squareness ratio and the minor curve flatness after magnetized in a low magnetizing field are lowered. Also, the rate of decrease of the coercivity and the rate of decrease of the minor curve flatness at high temperature become large.

On the other hand, in case a/b is larger than 0.28, the coercivity becomes larger. Also, the R-rich phase in the grain boundary phases increases and the rate of decrease of the coercivity and the rate of decrease of the minor curve flatness at high temperature become large.

In order to satisfy a low coercivity and to improve the squareness ratio and the minor curve flatness after magnetized in a low magnetizing field for use as the variable magnetic force motor, a/b is preferably 0.18 or more. Also, it is preferably 0.24 or less.

In the R-T-B based rare earth element sintered magnet according to the present embodiment, the ratio c/b which is the compositional atomic ratio of B with respect to the compositional atomic ratio of the transition metal element T satisfies 0.050≤c/b≤0.075. As such, by making the ratio of B content to 0.075 or less which is a stoichiometric ratio of the basic composition expressed by $R_2T_{14}B$, where 0.075 is a stoichiometric ratio of c/b in the basic composition expressed by $R_2T_{14}B$, a surplus of the rare earth element R and the transition metal element T form the grain boundary phases. As a result, the intergranular grain boundary can have a thickness enough to cut the magnetic exchange-coupling.

Thereby, the main phase crystal grains are magnetically separated and a single domain state after magnetized is stabilized, thus this has an effect to increase the squareness ratio and the minor curve flatness after magnetized in a low magnetizing field.

When c/b is smaller than 0.050, the $R_2T_{14}B$ phase is not formed sufficiently. Thus, the T-rich phase showing a soft magnetism is formed and the intergranular grain boundary cannot have a thickness enough to cut the magnetic exchange-coupling.

In case c/b is larger than 0.075, a ratio of the main phase increases, and as similar to mentioned in above, the intergranular grain boundary having a sufficient thickness cannot be formed. Therefore, the squareness ratio and the minor curve flatness decreases after magnetized in a low magnetizing field.

In order to satisfy a low coercivity and to improve the squareness ratio and the minor curve flatness after magnetized in a low magnetizing field for use as the variable magnetic force motor, c/b is preferably 0.060 or more. Also, c/b is preferably 0.070 or less and more preferably 0.066 or less.

The R-T-B based rare earth permanent magnet according to the present embodiment includes the element M. The element M is Ga, or a combination of Ga and one or more elements selected from Sn, Bi, and Si. A ratio d/b which is a ratio of the compositional atomic ratio of the element M with respect to the compositional atomic ratio of the transition metal satisfies 0.005≤d/b≤0.028.

When d/b is smaller than 0.005 or larger than 0.028, the intergranular grain boundary having a thickness enough to cut magnetic exchange-coupling cannot be formed. Therefore, the squareness ratio and the minor curve flatness after magnetized in a low magnetizing field decrease.

In order to ensure a low coercivity and to improve the squareness ratio and the minor curve flatness after magnetized in a low magnetizing field for use as the variable magnetic force motor, d/b preferably satisfies 0.008 or more. Also, d/b is preferably 0.019 or less.

Also, in order to enhance the above mentioned properties, for the R-T-B based rare earth permanent magnet according to the present invention, it is important to increase an area ratio of the R-T-M phase (a representative compound is an $R_6T_{13}M$ compound and is an antiferromagnetic phase) having $La_6Co_{11}Ga_3$ type structure with respect to a total area of the grain boundary phases.

Further, by controlling an area ratio of the T-rich phase (a phase other than the R-T-M phase and satisfying [R]/[T]<1.0 in which [R] and [T] represent number of atoms of R and T) showing ferromagnetism such as $RT_2$, $RT_3$, $R_2T_{17}$, and the like; and also by controlling an area ratio of the R-rich phase (a phase satisfying [R]/[T]>1.0 in which [R] and [T] represent number of atoms of R and T) showing paramagnetism or diamagnetism, a magnetic separation between the main phase crystal grains improves and a local demagnetization field can be reduced.

Specifically, in the present embodiment, the area ratio of the R-T-M phase having $La_6Co_{11}Ga_3$ type structure with respect to a total area of the grain boundary phases in an arbitrary cross section is 10.0% or more. In order to make the rate of decrease of the coercivity and the rate of decrease of the minor curve flatness at high temperature small, the area ratio of the R-T-M phase is preferably 30.2% or more, and more preferably 55.4% or more. Thereby, the magnet can be suitably used for the variable magnetic force motor.

In case the area ratio of the R-T-M phase is less than 10.0%, the area ratios of the T-rich phase and the R-rich phase with respect to the total area of the grain boundary phases increases, and the rate of decrease of the coercivity and the rate of decrease of the minor curve flatness at high temperature become large.

In the present embodiment, the area ratio of the T-rich phase with respect to a total area of the grain boundary phases in an arbitrary cross section is 60.0% or less.

In case the T-rich phase is segregated in the grain boundary phases, the T-rich phase tends to easily aggregate rather than existing in specific places such as the intergranular grain boundary (a grain boundary phase existing between two main phase crystal grains) and a triple junction (a grain boundary phase surrounded by three or more main phase crystal grains).

When the area ratio of the T-rich phase with respect to a total area of the grain boundary phases exceeds 60.0%, the T-rich phase showing ferromagnetism aggregates in the grain boundary phases and the area of the T-rich phase increases, thereby the T-rich phase becomes a magnetization reversal nucleus and a local demagnetization field increases. As a result, the rate of decrease of the coercivity and the rate of decrease of the minor curve flatness at high temperature become large.

Also, the T-rich phase preferably exist in the grain boundary phases which do not contact with the main phase crystal grain. When the T-rich phase of a ferromagnetic phase contacts with the main phase crystal grain, the T-rich phase is magnetized due to a stray magnetic field from the magnetization of the adjacent main phase crystal grain, thereby a local demagnetization field is generated. As a result, the rate of decrease of the coercivity and the rate of decrease of the minor curve flatness at high temperature become large.

In order to make the rate of decrease of the coercivity and the rate of decrease of the minor curve flatness at high temperature small, the area ratio of the T-rich phase is preferably 48.9% or less. Thereby, the magnet can be suitably used for the variable magnetic force motor.

In the present embodiment, the area ratio of the R-rich phase with respect to a total area of the grain boundary phases in an arbitrary cross section is 70.0% or less.

When the area ratio of the R-rich phase with respect to a total area of the grain boundary phases in an arbitrary cross section is larger than 70.0%, a coarse R-rich phase showing paramagnetism or diamagnetism tends to form in the triple junction. As a result, a stray magnetic field from the adjacent main phase crystal grains penetrates through the grain boundary phases and a local demagnetization field increases, and the rate of decrease of the coercivity and the rate of decrease of the minor curve flatness at high temperature become large.

Also, the R-rich phase preferably exist in the grain boundary phases which are not in contact with the main phase crystal grain. When the R-rich phase contacts with the main phase crystal grain, a larger stray magnetic field from the magnetization of the adjacent main phase crystal grains converges, thereby the larger local demagnetization field is generated in the R-rich phase. As a result, the rate of decrease of the coercivity and the rate of decrease of the minor curve flatness at high temperature may become larger. Further, in the R-rich phase, it is known that a corrosion tends to easily proceed, thus by decreasing the area ratio of the R-rich phase, the corrosion resistance also improves.

In order to decrease the rate of decrease of the coercivity and the rate of decrease of the minor curve flatness at high temperature, the area ratio of the R-rich phase is preferably 46.3% or less. Thereby, the magnet can be suitably used for the variable magnetic force motor.

Note that, the R-T-M phase tends to easily segregate in the intergranular grain boundary and also shows antiferromagnetism, thus by decreasing the area of the T-rich phase and the area of the R-rich phase, the main phase crystal grains are covered by the R-T-M phase showing antiferromagnetism. As a result, the stray magnetic field from the main phase crystal grain is prevented from penetrating through the grain boundary phases, thereby a local demagnetization field can be decreased.

As mentioned in above, by having 10.0% or more of the area ratio of the R-T-M phase having $La_6Co_{11}Ga_3$ type crystal structure with respect to a total area of the grain boundary phases; and also by having 60.0% or less of the area ratio of the T-rich phase with respect to a total area of the grain boundary phases, and by having 70.0% or less of the area ratio of the R-rich phase with respect to a total area of the grain boundary phases, the main phase crystal grains is covered by the R-T-M phase showing antiferromagnetism and also a local demagnetization field can be suppressed. Thereby, the rate of decrease of the coercivity and the rate of decrease of the minor curve flatness at high temperature can be made smaller.

In the present embodiment, a, b, c, and d preferably satisfy the relationships of 0.050≤c/b≤0.070, 0.25≤(a−2c)/(b−14c) ≤2.00, and 0.025≤d/(b−14c)≤0.500. By having c/b, (a−2c)/ (b−14c), and d/(b−14c) within the above-mentioned composition range, the area ratio of the above-mentioned phases with respect to a total area of the grain boundary phases can be easily controlled.

Here, (a−2c)/(b−14c) and d/(b−14c) as compositional parameters are described. (a−2c)/(b−14c) shows a ratio of the transition metal amount and the rare earth element amount in the grain boundary phases of the R-T-B based rare earth permanent magnet. Also, d/(b−14c) shows a ratio of the transition metal element amount and the element M amount in the grain boundary phases of the R-T-B based rare earth permanent magnet.

As mentioned in above, R of the R-T-B based rare earth permanent magnet includes R1, Sm, and R2 within the above-mentioned range, thus the compositional formula $(R1_{1-x-y}Sm_xR2_y)_aT_bB_cM_d$ which represents the R-T-B based rare earth permanent magnet, that is a total composition including the main phases and the grain boundary phases can also be expressed by below formula.

$$[aR+bT+cB+dM]$$

Here, by subtracting $R_2Fe_{14}B$ which is the basic composition of the R-T-B compound constituting the main phases from the total composition including the main phases and the grain boundary phases, the composition of the grain boundary phase component can be obtained. Here, when $c/b \leq 0.070 \leq 1/14$ is satisfied, by calculating the formula of "[a total composition]−[$R_2Fe_{14}B$ composition]", only the R, T, M elements constituting the R-T-M phase remain. By adjusting a coefficient so that B is 0, the remaining grain boundary phase composition can be obtained by the following equation.

$$[aR+bT+cB+dM]-[2cR+14cT+cB]=[(a-2c)R+(b-14c)T+dM]$$

According to the above equation, the coefficient of R, (a−2c), is the rare earth element amount in the grain boundary phase component, the coefficient of T, (b−14c), is the transitional metal amount in the grain boundary phase component, and the coefficient of M, d, is the element M amount in the grain boundary phase component.

That is, by making the ratio of the rare earth element amount to the transition metal element amount in the grain boundary phase component, (a−2c)/(b−14c), and the ratio of the element M amount to the transition metal element amount in the grain boundary phase component, d/(b−14c), within the above mentioned range, the area ratio of the R-T-M phase with respect to a total area of the grain boundary phases can be 10.0% or more, the area ratio of the T-rich phase with respect to a total area of the grain boundary phases can be 60.0% or less, and the area ratio of the R-rich phase with respect to a total area of the grain boundary phases can be 70.0% or less. Note that, it is confirmed that the ratio R/T=6/13 and the ratio M/T=1/13 of the R-T-M phase are included in the range of (a−2c)/(b−14c) and d/(b−14c), respectively. Hereinabove, due to the above composition and the microstructure which significantly decreased the local demagnetization field, the rate of decrease of the coercivity and the rate of decrease of the minor curve flatness at high temperature can be made smaller. As a result, the R-T-B based rare earth permanent magnet can be obtained which is suitable for the variable magnetic force motor capable of maintaining a high efficiency in a wide rotational speed range.

The R-T-B based rare earth permanent magnet according to the present embodiment may include one or more of Al, Cu, Zr, and Nb which promote reaction during a powder metallurgy step of the main phase crystal grains. More preferably one or more of Al, Cu, and Zr are included; and even more preferably Al, Cu, and Zr are included. Content of above mentioned elements are preferably 0.1 to 2 at % in total. Reaction on a surface layer of the main phase crystal grains can be generated by adding the above elements to the rare earth magnet, thereby distortion, defect, and the like can be removed.

In the present embodiment, the average crystal grain size D50 of the main phase crystal grains is D50≤4.00 μm. In order to improve the squareness ratio and the minor curve flatness after magnetized in a low magnetizing field, it is effective that a single domain state after magnetized is stable. When D50 is larger than 4.00 μm, due to a balance between the magnetostatic energy and the magnetic domain wall energy, the multidomain structure rather than the single domain structure is stabilized in main phase crystal grains after magnetized, and the magnetic domain wall moves freely in accordance with the change of magnetic field during a demagnetizing process and a magnetizing process. Thus, the squareness ratio and the minor curve flatness after magnetized in a low magnetizing field are deteriorated.

For the stabilization of the single domain structure of the main phase crystal grains after magnetized, D50 is preferably 3.92 μm or less, more preferably 2.98 μm or less, and even more preferably 2.05 μm or less. Also, an excessive refining of the grain size leads to a high coercivity, which is not suitable for the variable magnetic force motor. Therefore, in order to satisfy a low coercivity, D50 is preferably 1.01 μm or more, and it is more preferably 1.49 μm or more.

As an indicator showing the grain size distribution of the main phase crystal grains according to the present embodiment, (D90−D10)/D50 is used. According to the present embodiment, (D90−D10)/D50≤1.60 is satisfied. Note that, according to the present embodiment, D50 is a diameter (circle equivalent diameter) of a circle having an area where cumulative distribution of area of the main phase crystal grains becomes 50%; D90 is a circle equivalent diameter of an area where cumulative distribution of area of the main phase crystal grains becomes 90%; and D10 is a circle equivalent diameter of an area where cumulative distributions of area of the main phase crystal grains becomes 10%. Thus, a smaller (D90−D10)/D50 indicates a smaller dispersion in the grain size distribution of the main phase crystal grains.

In order to improve the squareness ratio and the minor curve flatness after magnetized in a low magnetizing field, it is effective to reduce the dispersion of the nucleation field of reverse magnetic domain. The nucleation field of reverse magnetic domain depends on the grain size of the main phase crystal grains. Therefore, it is important to control the dispersion of the grain size distribution of the main phase crystal grains, and it is preferably within the above range. When (D90−D10)/D50 is larger than 1.60 and the dispersion of the grain size distribution becomes large, the dispersion of the nucleation field of reverse magnetic domain increases, thus the minor curve flatness lowers. Also, in order to further decrease the dispersion of the nucleation field of reverse magnetic domain, (D90−D10)/D50 is preferably 1.19 or less, and more preferably 0.99 or less.

In the present embodiment, the grain boundary phases include the intergranular grain phase (a grain boundary phase existing between the main phase crystal grains) and the triple junction (a grain boundary phase surrounded by three or more main phase crystal grains). The grain boundary phases are preferably non-ferromagnetic, and the thickness of the grain boundary phase is preferably 3 nm or more and 1 μm or less.

Also, a grain boundary phase coverage is 70.0% or more which is the ratio of the grain boundary phase covering the outer circumference of the main phase crystal grains. Even if the average grain size and the dispersion of grain size distribution of the main phase crystal grains are controlled, when the grain boundary phase coverage is less than 70.0%, the main phase crystal grains which are magnetic exchange-coupling with the adjacent main phase crystal grains increases, and exchange-coupled grains with small grain sizes become magnetically equivalent to one grain with large grain size. When many main phase crystal grains having such magnetically large grain size exist, this means that grains with large grain size (exchange-coupled grains) and grains having small grain size (not exchange-coupled grains) coexist, thus this is magnetically equivalent to a large dispersion state of the grain size distribution of the main phase crystal grains. Consequently, the single domain state after magnetized is destabilized and the dispersion of the nucleation field of reverse magnetic domain becomes large. Thus, the squareness ratio and the minor curve flatness after magnetized in a low magnetizing field are lowered.

Further, when the grain boundary phase coverage is less than 70.0%, the local demagnetization field increases because more main phase crystal grains contact with the adjacent main phase crystal grains and also because more edges are generated on the surfaces of the main phase crystal grains which are not coated by the grain boundary phases. As a result, the single domain state after magnetized in a low magnetizing field Hmag cannot be realized, and the squareness ratio and the minor curve flatness after magnetized in a low magnetizing field are lowered.

In order to improve the squareness ratio and the minor curve flatness after magnetized in a low magnetizing field, the grain boundary phase coverage is preferably 90.0% or more.

Note that, the grain boundary phase coverage is calculated as a ratio of a total length of outline of the main phase crystal grains covered by the grain boundary phases having a predetermined thickness with respect to a total length of outline of the main phase crystal grains in a cross section of the R-T-B based permanent magnet.

The R-T-B based rare earth permanent magnet according to the present embodiment may include O (oxygen) as other elements. Oxygen (O) content is 2,000 to 8,000 ppma (parts per million atomic). When the oxygen content is smaller than the above-mentioned range, the corrosion resistance of a sintered magnet becomes insufficient, when the oxygen content is larger the above-mentioned range, a liquid phase during sintering is not sufficiently formed, the main phase crystal grains will not be sufficiently coated with the grain boundary phases, and the squareness ratio and the minor curve flatness after magnetized in a low magnetizing field are lowered. In order to make the corrosion resistance the squareness ratio and the minor curve flatness after magnetized in a low magnetizing field higher, the oxygen content is preferably 2,500 to 7,000 ppma.

Also, N content in the R-T-B based rare earth permanent magnet according to the present embodiment is preferably 8,000 ppma or less. When N content is larger than the above-mentioned range, the squareness ratio and the minor curve flatness after magnetized in a low magnetizing field tend to be lower.

A preferable example according to the method for manufacturing the present invention will be descried hereinafter.

For manufacturing the R-T-B based permanent magnet according to the present embodiment, first a raw material alloy is prepared which can provide the R-T-B based rare earth permanent magnet having the composition used for the present invention. The raw material alloy can be manufactured in vacuum or in inert gas atmosphere, and desirably in Ar atmosphere, by a strip casting method or other known dissolution methods.

The strip casting method is a method for obtaining an alloy in which a molten metal obtained by dissolving raw material metals in non-oxidized atmosphere such as Ar gas atmosphere is extruded to a rolling roller surface. The rapidly cooled molten metal on the roll is rapidly solidified to a thin-plate or a thin-film (a flake). Such rapidly solidified alloy has a homogeneous structure having a crystal grain size of 1 μm to 50 μm.

The raw material alloy can be obtained not only by the strip casting method but also by dissolution methods such as a high frequency induction dissolution and the like. Note that, in order to prevent segregation after dissolution, for instance, it can be poured on to an inclined water-cooling copper plate and solidified. Also, an alloy obtained by a reduction diffusion method can be used as the raw material alloy.

As the raw material metals of the present embodiment, rare earth metal, rare earth metal alloy, pure iron, ferroboron, alloys thereof, and the like can be used. Also, Al, Cu, Zr, and Nb may be included as additional elements. Note that, a content of the additional elements is preferably 20,000 ppm or less. The squareness ratio and the minor curve flatness after magnetized in a low magnetizing field are lowered when the content of the additional elements is larger than this range.

Note that, Al, Cu, Zr, and Nb may be included as part of the raw material metals, thus it is necessary to set a purity level of the raw material metals and adjust the content of the additional elements to a predetermined amount. Also, in case impurities are mixed during manufacturing, an amount of impurities needs to be taken into account as well.

In order to obtain the R-T-B based rare earth permanent magnet according to the present invention, a method of manufacturing the magnet from an alloy of a single kind, so-called a single alloy method, is basically applied to the raw material alloy. However, a so-called mixing method can be applied as well which uses the main phase alloy (a low R alloy) mainly having $R_2T_{14}B$ crystals as main phase crystal grains and an alloy (a high R alloy) which includes R more than the low R alloy and effectively contributes to the formation of grain boundary.

The raw material alloy is subjected to a pulverization step. In case of using the mixing method, the low R alloy and the high R alloy may be pulverized separately or collectively.

The pulverization step includes a coarse crush step and a fine pulverization step. At first, the raw material alloy is coarsely crushed till a grain size is about several hundreds Preferably, the coarse crush step is performed using a stamp mill, a jaw crusher, a brown mill, and the like in inert gas atmosphere. In the coarse crush step, pulverization can be done effectively by dehydrogenating after a hydrogen storage in the raw material alloy. The raw material alloy manufactured by a strip casting method has a structure in which the main phase component having a width approximately equal to the target grain size is separated by a dendrite shaped R-rich phase. Cracks are generated by expansion of the R-rich phase when hydrogen is stored in R-rich phase. Thus, a pulverization efficiency at the fine pulverization step after the coarse crush step is improved and inhibits the dispersion of the grain size distribution of the main phase crystal grains.

A hydrogen storage treatment is performed by exposing the raw material alloy in hydrogen gas of an atmospheric pressure. A holding temperature during the hydrogen storage is usually room temperature. In case a content ratio of R2 in the rare earth element is high, the hydrogen storage becomes difficult to perform to the R-rich phase having a high content ratio of R2 at room temperature. Therefore, the holding temperature is preferably higher than room temperature and may be 500° C. or less. A holding time varies according to the relationship with the holding temperature, a composition and weight of the raw material alloy, and the like; and it is at least 30 minutes or more and desirably 1 hour or more per 1 kg. The dehydrogenation treatment after the hydrogen storage is performed to decrease hydrogen as an impurity for the rare earth sintered magnet.

The dehydrogenation treatment is performed by heating the raw material alloy in vacuum or inert gas atmosphere. A heat temperature is 200 to 400° C. or more, and desirably 300° C. A holding time varies according to the relationship between the holding temperature, a composition and weight of the raw material alloy, and the like; and it is set at least 30 minutes or more and desirably 1 hour or more per 1 kg. A hydrogen releasing treatment is performed in vacuum or in Ar gas flow. Note that, the hydrogen storage treatment and the dehydrogenation treatment are not essential treatments. This hydrogen crush may be considered as the coarse crush and a mechanical coarse crush may be omitted.

After performing the coarse crush step, the fine pulverization step is performed. A jet mill is mainly used for the fine pulverization, and the coarsely crushed powder having a grain size of about several hundreds μm is pulverized to an average grain size of 1.2 to 4 μm, and desirably 1.5 to 3 μm.

A jet mill is a method which pulverizes by a high pressure inert gas discharged from a narrow nozzle and generate a high speed gas flow, and the coarsely crushed powder is accelerated with this high speed gas flow, then the coarsely crushed powders collide against each other or the coarsely crushed powder collide with target or container wall. The crushed powder is classified by a classification rotor installed in a pulverizer and a cyclone placed at lower section of the pulverizer.

A wet pulverization may be used for the fine pulverization. A ball mill, a wet attritor, and the like are used for the wet pulverization, and the coarsely crushed powder having the grain size of about several hundreds μm is pulverized to an average grain size of 1.5 to 4 μm, and desirably 2 to 3 μm. In the wet pulverization, by selecting a suitable dispersion medium, the pulverization is progressed without exposing the magnet powder to oxygen. Thus, a low oxygen concentration fine powder can be obtained.

According to the present embodiment, in order for the grain size distribution of crystal grains included in the main phase to satisfy the following formula: (D90−D10)/D50≤1.60, it is preferable that the collected fine pulverized powder is poured back into a jet mill after finely pulverization step, and a step for a further classification can be carried out.

Due to the addition of this classification step, the finely pulverized powder having a further sharp grain size distribution can be obtained.

The finely pulverized powder is subjected to a molding step. Note that, fatty acids, derivatives of the fatty acids, or hydrocarbons can be added in order to improve lubrication and orientation during molding. For instance, fatty acids of stearic acid based, lauryl acid based, or oleic acid based such as zinc stearate, calcium stearate, aluminum stearate, amide stearate, amide laurate, amide oleate, amide ethylene bis isostearate; and hydrocarbons such as paraffin, naphthalene, and the like may be added in an mount about 0.01 to 0.3 wt % during the fine pulverization.

A molding pressure during molding in the magnetic field may be 0.3 to 3 ton/cm$^2$ (30 to 300 MPa). The molding pressure may be constant from the beginning to the end of molding, also it may gradually increase or gradually decrease, or may change irregularly. As the molding pressure decreases, an orientation becomes better; however, when the molding pressure is too low, strength of the green compact becomes insufficient which causes a handling problem. Thus, the molding pressure is selected from the above-mentioned range taking this point into account. A green compact obtained by molding in the magnetic field generally has a final relative density of 40 to 60%.

A magnetic field of about 960 kA/m to 1,600 kA/m may be applied. The applied magnetic field is not limited to a static magnetic field, and it may be a pulse-like magnetic field. In addition, the static magnetic field and the pulse-like magnetic field can be used together.

The green compact is submitted to a sintering step. The sintering step is performed in vacuum or in inert gas atmosphere. A holding temperature and a holding time of the sintering needs to be regulated according to various conditions, such as the composition, the pulverization method, the difference between an average grain size and the grain size distribution, and the like. The sintering step may be performed at approximately 1,000° C. to 1,200° C. for 1 minute to 20 hours, and it is preferably 4 to 20 hours.

After sintering, an aging treatment may be performed to the obtained sintered magnet. After going through this aging treatment step, a constitution of the grain boundary phase formed between adjacent $R_2T_{14}B$ main phase crystal grains is determined. However, the microstructure is controlled not only by this step, but it is also determined depending on the balance between various conditions of the above sintering step and the state of the raw material fine powder. Therefore, considering the relationship between the heat treatment conditions and the microstructure of the sintered magnet, a heat treatment temperature, a length of time, and a cooling rate may be determined. The heat treatment may be performed within a range of 400° C. to 900° C.

The rare earth magnet according to the present embodiment can be obtained by the method described in above; however, the method for manufacturing the rare earth magnet is not limited thereto and can be suitably modified.

A definition and an evaluation method for a magnetizing field Hmag, the squareness ratio, and an indicator of the minor curve flatness according to the present embodiment are described.

A BH tracer is used to carry out necessary measurement for evaluation. In the present embodiment, among the magnetizing field Hmag, the least necessary magnetic field in which the squareness ratio and the minor curve flatness show reproducibility after repetitive measurements are defined as a minimum magnetizing field Hmag.

Figure 2:
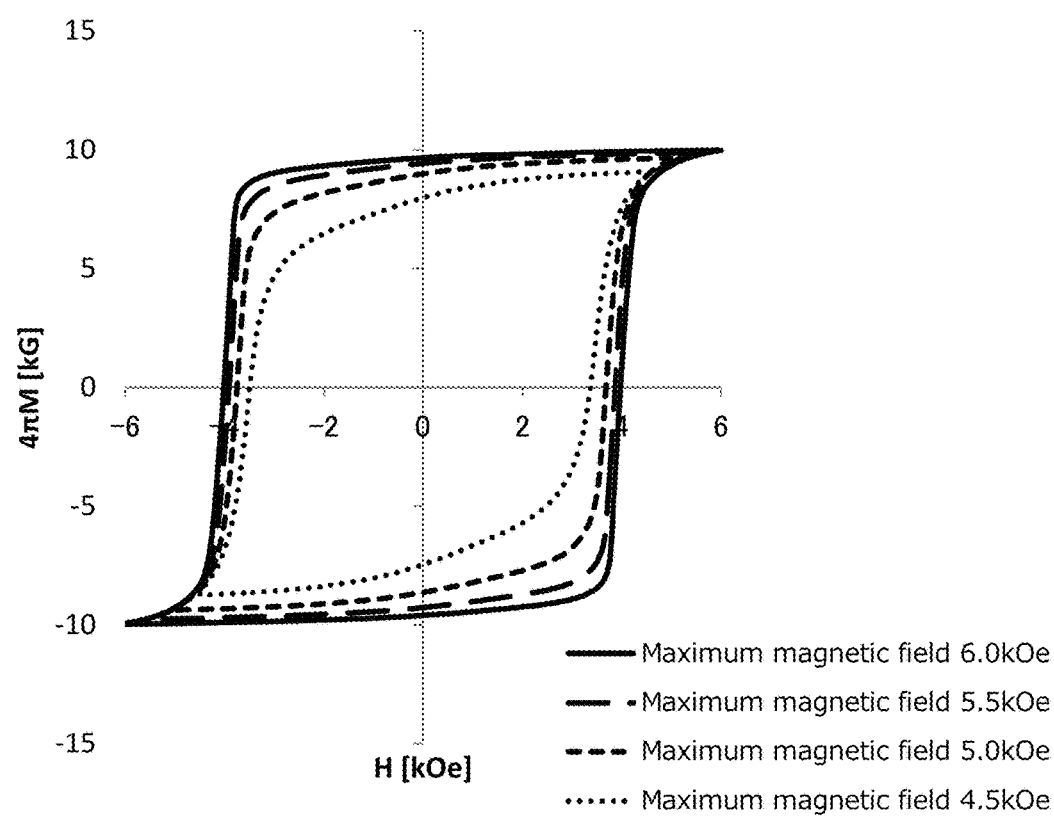
FIG. 2 is a figure showing hysteresis curves measured by increasing a maximum measuring magnetic field with regard to a sample of Experiment 2-18.

A specific evaluation method is shown using a sample of a below described Experiment 2-18 in FIG. 2. A hysteresis loop is measured by increasing the maximum measuring magnetic field in a constant interval of magnetic field. In case the hysteresis loop closes and shows a symmetric shape (difference of the coercivity between positive side and negative side is less than 5%), a reproducibility is guaranteed to repetitive measurement. Thus, the obtained least necessary maximum magnetic field is defined as a minimum magnetizing field Hmag.

Next, the squareness ratio $Hk_{\_Hmag}/HcJ_{\_Hmag}$ of the minor curve measured after magnetized in the minimum magnetizing field Hmag is used as the squareness ratio after magnetized in the minimum magnetizing field. Here, $Hk_{\_Hmag}$ is a value of the magnetic field which is 90% of a remanence $Br_{\_Hmag}$ measured in a minimum magnetizing field Hmag in the second quadrant of the minor curve measured after magnetized in the minimum magnetizing field Hmag. Further, $HcJ_{\_Hmag}$ is a coercivity of the minor curve measured after magnetized in the minimum magnetizing field Hmag.

Figure 3:
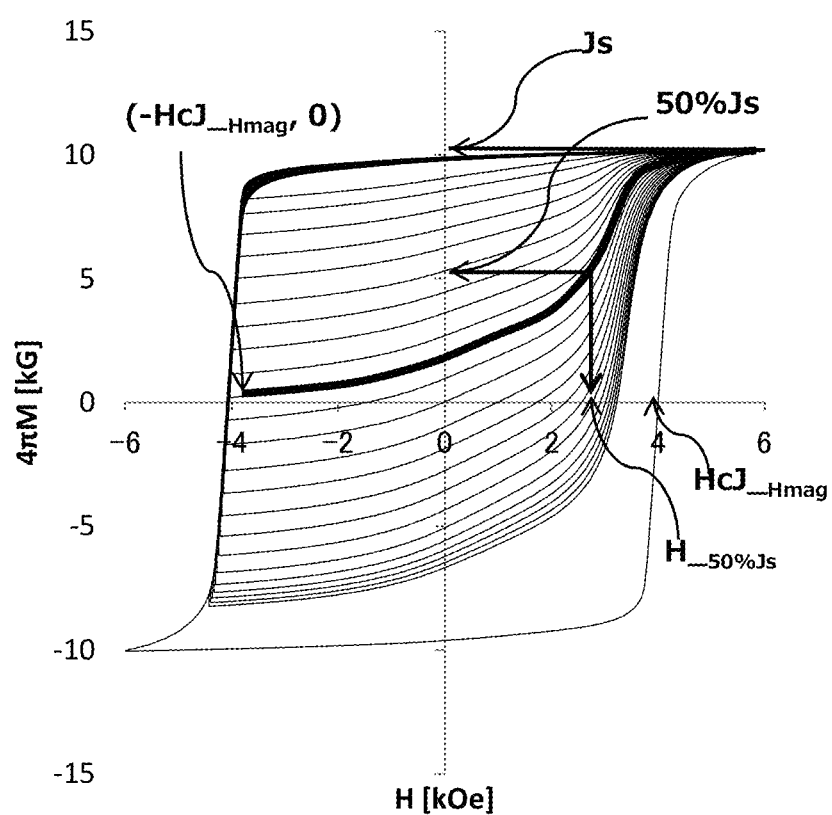
FIG. 3 is a figure showing minor curves of a sample of Experiment 2-18.

The indicator of the minor curve flatness is determined and evaluated as following. FIG. 3 shows the minor curves measured by varying the reverse magnetic field Hrev with regard to the sample of Experiment 2-18. The indicator of the minor curve flatness is determined as $$H_{\_50\%\ J_s}/HcJ_{\_Hmag},$$

which is a ratio of $H_{\_50\%\ J_s}$ to $HcJ_{\_Hmag}$ according to the magnetization curve (thick line in FIG. 3) from the operating point ($-HcJ_{\_Hmag}$, 0) corresponding to the coercivity at the second and third quadrants of the minor curves among the magnetization curves from a plural reverse magnetic fields Hrev. In the above, $H_{\_50\%\ J_s}$ is the magnetic field where the magnetic polarization becomes 50% of the magnetic polarization Js when the minimum magnetizing field Hmag is applied; and $HcJ_{\_Hmag}$ is the coercivity of the minor curve after magnetized in the minimum magnetizing field Hmag.

In order to be used as the variable magnetic flux magnet, the minimum magnetizing field Hmag of the rare earth magnet according to the present embodiment is preferably 7.0 kOe or less and more preferably 6.0 kOe or less.

Also, the remanence ($Br_{\_Hmag}$) of the rare earth magnet according to the present embodiment at the minimum magnetizing field is preferably 9.5 kG or more and more preferably 10.0 kG or more.

Also, the coercivity ($HcJ_{\_Hmag}$) of the rare earth magnet according to the present embodiment at the minimum magnetizing field is preferably 5.0 kOe or less and more preferably 4.0 kOe or less. Also, $HcJ_{\_Hmag}$ is preferably 0.50 kOe or more and more preferably 1.1 kOe or more. In case $HcJ_{\_Hmag}$ is too small, the magnet is demagnetized while motor is driving.

Also, the squareness ratio ($Hk/HcJ_{\_Hmag}$) of the rare earth magnet according to the present embodiment at the minimum magnetizing field is preferably at least 80% (0.80) or more and more preferably 90% (0.90) or more.

The minor curve flatness ($H_{\_50\%\ J_s}/HcJ_{\_Hmag}$) of the rare earth magnet according to the present embodiment at the minimum magnetizing field is preferably at least 50% (0.50) or more and more preferably 80% (0.80) or more.

Next, an evaluation of the rate of decrease of the coercivity at high temperature according to the R-T-B based rare earth permanent magnet of the present embodiment is described. First, the coercivity at the minimum magnetizing field at room temperature (23° C.) is measured and defined as $HcJ_{\_23°\ C.}$. The sample is then heated at 180° C. for about 5 minutes. While the temperature of the samples is in a stable state, the coercivity at the minimum magnetizing field is measured and defined as $HcJ_{\_180°\ C.}$. Here, the rate of decrease δ(%/° C.) of the coercivity at high temperature is defined as following:

$$\delta = |(HcJ_{\_180°\ C.} - HcJ_{\_23°\ C.})/HcJ_{\_23°\ C.}/(180-23) \times 100|$$

The rate of decrease of the coercivity at high temperature is preferably at least 0.45%/° C. or less and more preferably 0.40%/° C. or less for use as the variable magnetic flux magnet.

An evaluation of the rate of decrease of the minor curve flatness at high temperature according to the R-T-B based rare earth permanent magnet of the present invention is described. At first, $H_{\_50\%\ J_s}/HcJ_{\_Hmag}$ at the minimum magnetizing field at room temperature (23° C.) is measured and defined as $P_{\_23°\ C.}$. Then, the sample is heated at 180° C. and held for 5 minutes. While the temperature of the sample is in a stable state, the $H_{\_50\%\ J_s}/HcJ_{\_Hmag}$ at the minimum magnetizing field is measured and defined as $P_{\_180°\ C.}$. Here, the rate of decrease ε (%/° C.) of the minor curve flatness at high temperature is defined as following:

$$\varepsilon = |(P_{\_180°\ C.} - P_{\_23°\ C.})/P_{\_23°\ C.}/(180-23) \times 100|$$

The rate of decrease of the minor curve flatness is preferably at least 0.30%/° C. or less and more preferably 0.25%/° C. or less for use as the variable magnetic flux magnet. The average crystal grain size, the grain size distribution, and the grain boundary phase coverage of the rare earth magnet according to the present embodiment can be evaluated using SEM (Scanning Electron Microscope). The polished cross section of the sample which has been evaluated with the above-mentioned magnetic properties is observed, and the main phase crystal grains and other phases such as the grain boundary phases are verified by a backscattered electron composition image (COMPO). The polished cross section of the observation target is observed at a magnification capable of recognizing the intergranular grain boundary phase having a predetermined thickness, and for example under a magnification of 5000× or more. The polished cross section may be parallel or orthogonal to the orientation axis, alternatively it may be at an arbitrary angle to the orientation axis.

Figure 4:
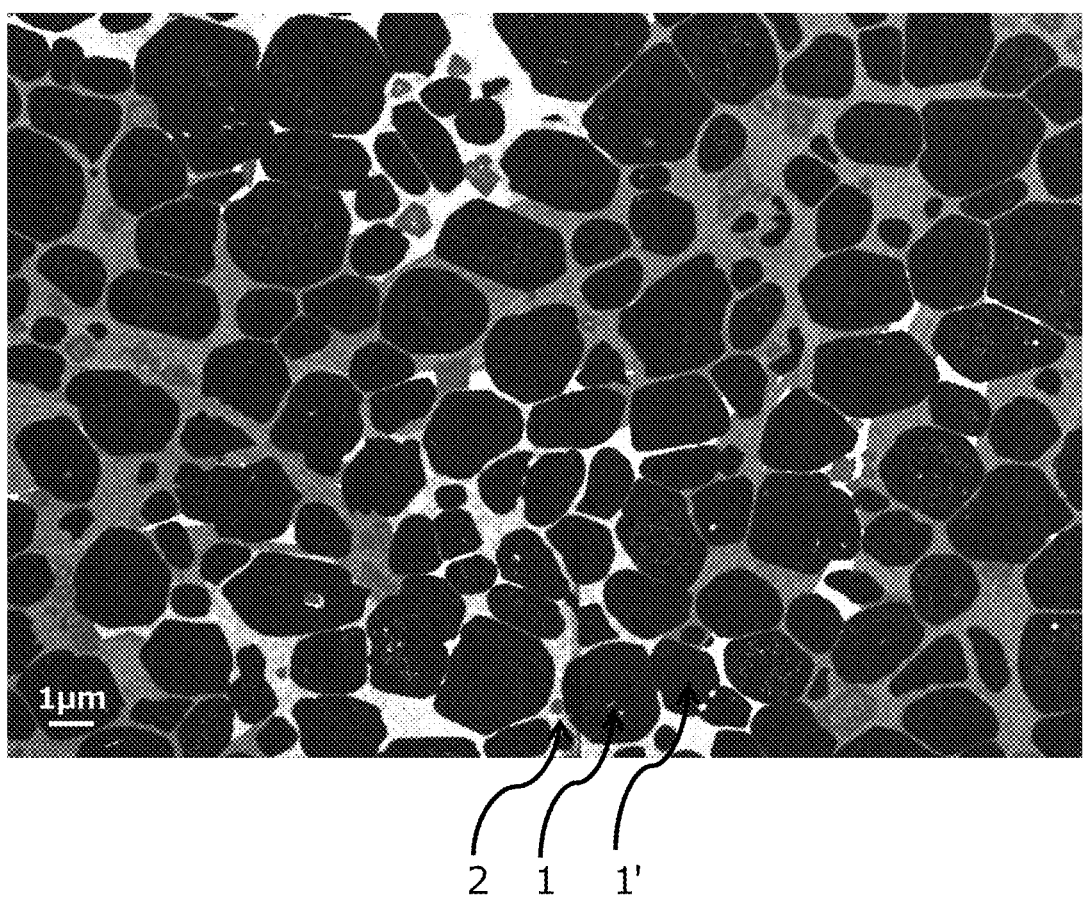
FIG. 4 is a figure showing SEM backscattered electron image of a cross section of a sample of Experiment 2-18.

FIG. 4 shows SEM backscattered electron image of a cross section of the sample of Experiment 2-18. This image is read by an image analysis software to extract an outline of each main phase crystal grain 1, and the cross sectional area is obtained. In case the area circle equivalent diameters where the cumulative distribution of cross sectional area of the main phase crystal grains becomes 10%, 50%, and 90% are respectively defined as D10, D50 and D90; and the medium value D50 is defined as the average crystal grain size of the main phase crystal grains, (D90−D10)/D50 is defined as the grain size distribution. When the grain size distribution (D90−D10)/D50 is zero, this means that there is no grain size dispersion, and as the grain size distribution (D90−D10)/D50 becomes larger, the dispersion becomes larger. Here, FIG. 5 shows outlines of the main phase crystal grains extracted from the image analysis of the image in FIG. 4.

Figure 5:
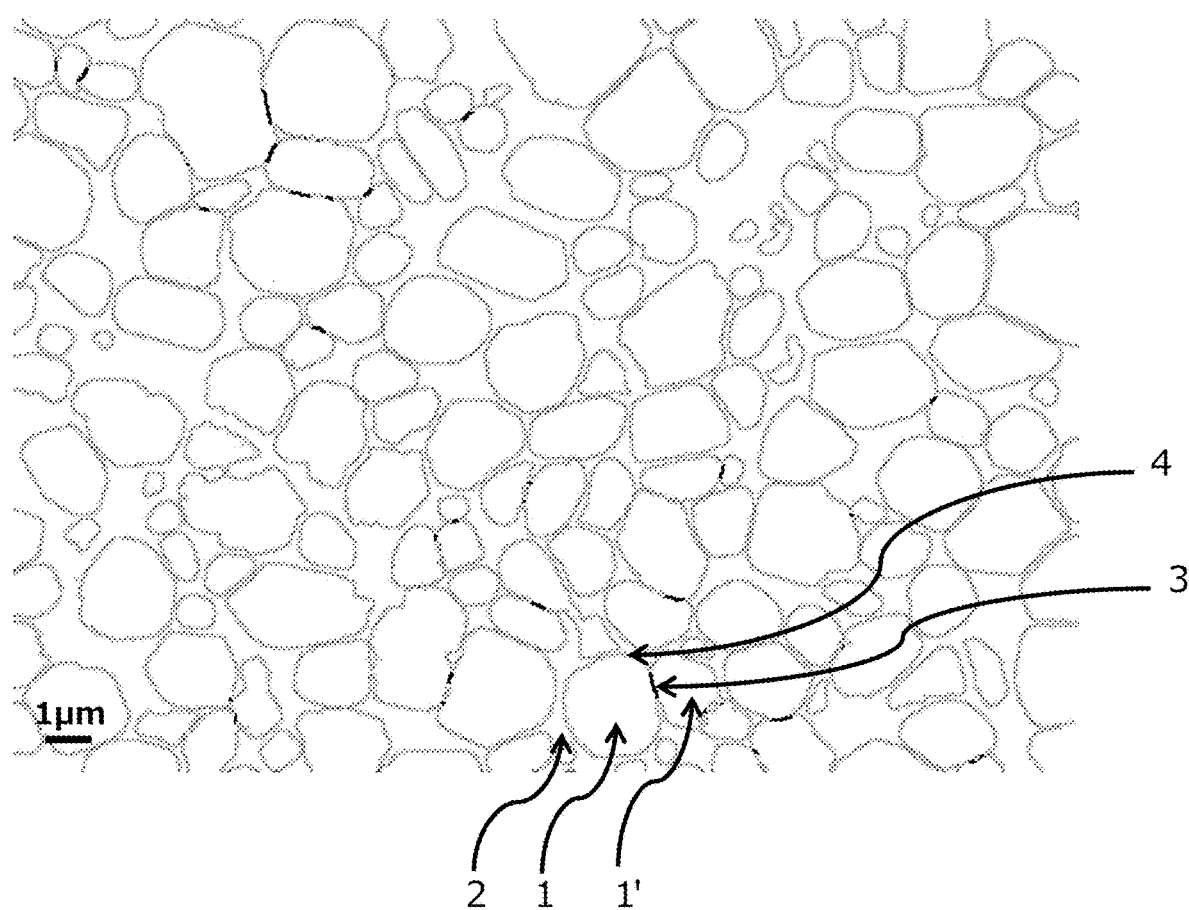
FIG. 5 shows outlines of the main phase crystal grains extracted by image analysis of the image from FIG. 4.
Figure 6A:
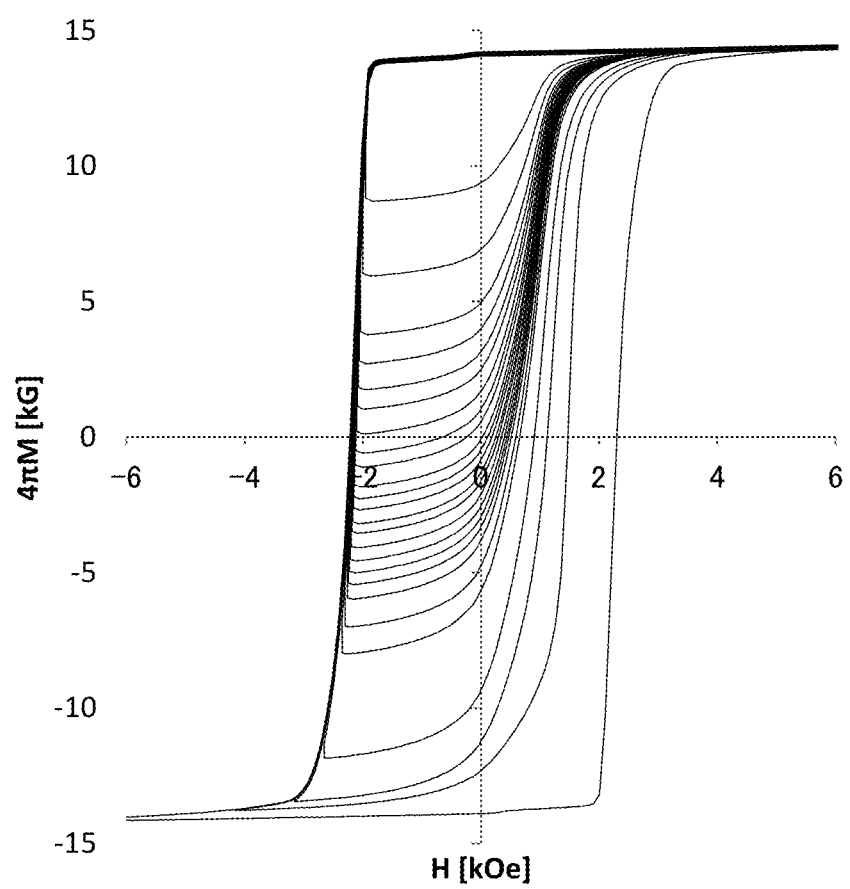
FIG. 6A is a figure showing a hysteresis curve of a sample according to Patent Document 3 when a magnetizing field is 30 kOe.
Figure 6B:
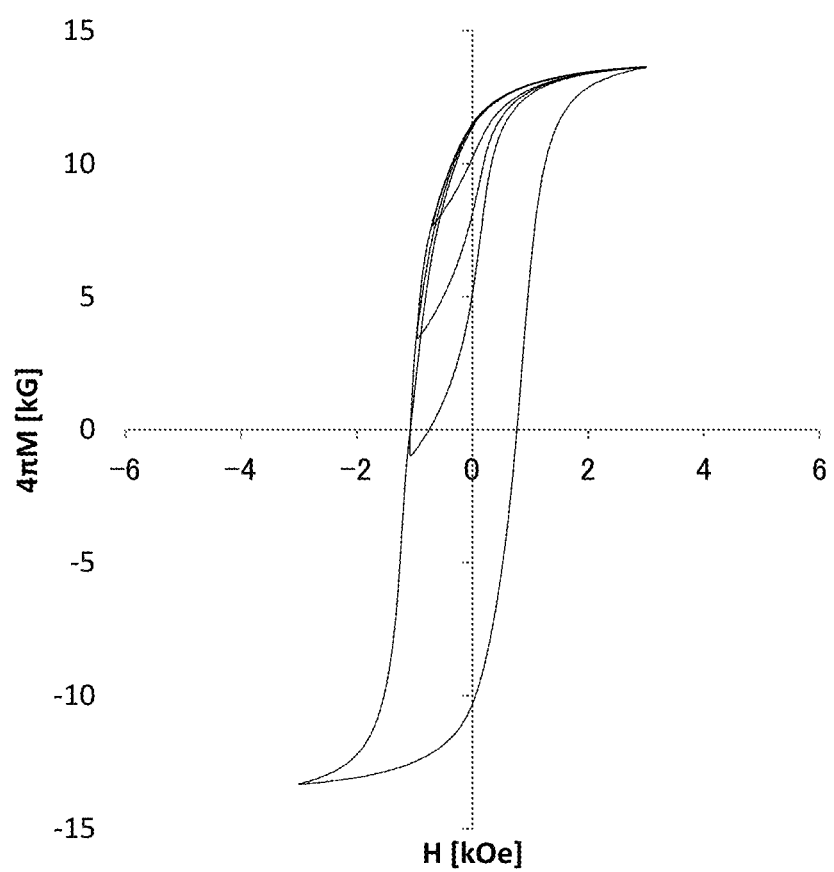
FIG. 6B is a figure showing a hysteresis curve of a sample according to Patent Document 3 when a magnetizing field is 10 kOe.

In FIG. 5, among the outlines of each main phase crystal grain 1 extracted from SEM backscattered electron image, a length of part 3 contacting the other adjacent main phase crystal grain 1' and a length of part 4 contacting the grain boundary phase 2 are distinctly calculated per each individual grain. Thereby, a ratio of a total length contacting the grain boundary phase with respect to a total length of outlines of all main phase crystal grains 1 is calculated as the grain boundary phase coverage.

Here, in the grain boundary phase, an area having a contrast of composition different from the main phase and having a sufficiently wider width (20 nm in case D50 is 1.0 µm or more and 5 nm in case D50 is less than 1.0 µm) than 3 nm which is a thickness capable to cut exchange-coupling is recognized. The outline part of the main phase crystal grains contacting such domain is detected as a part contacting with the grain boundary phase. A series of such measurement and calculation are performed on at least five fields in a cross section of the magnet, and the mean value thereof is determined as a representative value of each parameter.

The composition and the area ratio of the various grain boundary phases according to the present embodiment can be evaluated by using SEM (scanning electron microscope) and EPMA (electron probe micro analyzer). The polished cross section of the sample of which the above magnetic properties are evaluated is observed. A magnification is set so that approximately 200 main phase crystal grains can be observed in the polished cross section of the observation target, however, the magnification may be determined according to a size, a dispersion state, and the like of each grain boundary phase. The polished cross section may be parallel, orthogonal, or at an arbitrary angle to the orientation axis. This cross sectional area is subjected to an area analysis using EPMA, thereby the distribution state of each element becomes obvious and the distribution state of main phase and each grain boundary phase become obvious.

In addition, each grain boundary phase included in an observation field performed with the area analysis is subjected to a point analysis by EPMA to quantitatively determine the composition. Thereby, the area belonging to the R-T-M phase, the area belonging to the T-rich phase, and the area belonging to the R-rich phase are specified. In each area, when number of atoms of R, T, and M are defined as [R], [T] and [M], the area showing [R]/[T]>1.0 is distinguished as the R-rich phase, the area showing 0.4≤[R]/[T] ≤0.5 and 0.0<[M]/[T]<0.1 is distinguished as the R-T-M phase, and the area other than the R-T-M phase and also showing [R]/[T]<1.0 is distinguished as the T-rich phase. Based on results of the area analysis and the point analysis by EPMA, from a backscattered electron image (A contrast derived from the composition can be obtained. See FIG. 4) obtained by SEM observed in the same observation field, the image of this observation field is read by the image analysis software. Then, the area ratio of the areas belonging to the R-T-M phase, the T-rich phase, and the R-rich phase are calculated. Namely, the area ratio refers to a ratio of area of each grain boundary phase with respect to a total area of the grain boundary phases. Series of these measurements and calculations are carried out to five or more observation fields in the cross section of the magnet for the sample, and the average value is determined as a representative value of each parameter.

EXAMPLES

Hereinafter, the present invention will be described in detail referring to examples and comparative examples, however, the present invention is not limited thereto.
(Experiment 1)

Raw materials were blended to obtain R-T-B based sintered magnets having a composition shown in Table 1, and the raw materials were dissolved and casted by a strip casting method. Then, a raw material alloy of flake form was obtained.

Next, hydrogen was stored in the raw material alloy at 500° C., and the raw material was subjected to a heat treatment at 300° C. for 1 hour in Ar atmosphere, then cooled to room temperature, followed by performing a heat treatment again at 300° C. for 1 hour in vacuum atmosphere. Thereby, a hydrogen crush treatment was performed. Subsequently, the obtained pulverized material was cooled to room temperature in Ar atmosphere.

Next, 0.1 mass % of amide laurate as a pulverization aid was added to the hydrogen crush treated coarsely crushed powder, and a fine pulverization was carried out using a jet mill. During the fine pulverization, a rotational speed of a classification rotor in the jet mill was adjusted so that an average grain size of the finely pulverized power was 1.7 μm. After the fine pulverization, the collected fine pulverization powder was poured in the jet mill again and classification was performed twice. Therefore, a classification accuracy was improved and the dispersion of the grain size distribution was lowered.

The obtained finely pulverized powder was filled in a metal mold placed in an electro magnet, and molding was performed in the magnetic field by applying a pressure of 120 MPa in the magnetic field of 1,200 kA/m.

Subsequently, the obtained green compact was sintered. After carrying out sintering in vacuum at 1,030° C. for four hours, then rapid cooling was performed to obtain a sintered magnet (R-T-B based sintered magnet). The obtained sintered magnet was subjected to an aging treatment in Ar atmosphere at 590° C. for one hour, and R-T-B based sintered magnets of Experiments 1-1 to 1-22 were obtained.

Note that, in the present examples, each step mentioned in above from the hydrogen crush treatment to sintering was performed in an inert gas atmosphere having an oxygen concentration of less than 50 ppm.

Compositional analysis of the R-T-B based sintered magnets according to Experiments 1-1 to 1-22 were performed. Results are shown in Table 1. A content of each element shown in Table 1 was measured by Inductively Coupled Plasma (ICP) Emission Spectrometry.

TABLE 1

| | Magnet composition (at %) | | | | | | | | | | |
|---|---|---|---|---|---|---|---|---|---|---|---|
| | Nd | Sm | Y | Fe | Co | B | Ga | Al | Cu | Zr | x |
| Experiment 1-1 | 9.11 | 0.93 | 8.21 | 75.48 | 0.57 | 3.42 | 1.44 | 0.66 | 0.07 | 0.10 | 0.051 |
| Experiment 1-2 | 6.45 | 0.65 | 5.81 | 80.05 | 0.60 | 4.03 | 1.53 | 0.70 | 0.08 | 0.11 | 0.050 |
| Experiment 1-3 | 6.94 | 0.70 | 6.30 | 79.09 | 0.60 | 3.98 | 1.51 | 0.69 | 0.07 | 0.11 | 0.050 |
| Experiment 1-4 | 9.07 | 0.91 | 8.20 | 75.19 | 0.57 | 3.79 | 1.44 | 0.65 | 0.07 | 0.10 | 0.050 |
| Experiment 1-5 | 5.67 | 0.57 | 5.15 | 80.70 | 0.61 | 4.88 | 1.54 | 0.70 | 0.08 | 0.11 | 0.050 |
| Experiment 1-6 | 6.39 | 0.65 | 5.76 | 79.41 | 0.60 | 4.80 | 1.52 | 0.69 | 0.08 | 0.11 | 0.051 |
| Experiment 1-7 | 10.22 | 1.02 | 9.20 | 72.45 | 0.55 | 4.38 | 1.39 | 0.63 | 0.07 | 0.10 | 0.050 |
| Experiment 1-8 | 10.77 | 1.08 | 9.73 | 71.41 | 0.54 | 4.32 | 1.37 | 0.62 | 0.07 | 0.10 | 0.050 |
| Experiment 1-9 | 10.17 | 1.02 | 9.16 | 72.13 | 0.54 | 4.81 | 1.38 | 0.63 | 0.07 | 0.10 | 0.050 |
| Experiment 1-10 | 6.40 | 0.64 | 5.80 | 79.66 | 0.60 | 5.62 | 0.40 | 0.69 | 0.08 | 0.11 | 0.050 |
| Experiment 1-11 | 10.13 | 1.03 | 9.13 | 71.93 | 0.54 | 5.07 | 1.38 | 0.63 | 0.07 | 0.10 | 0.051 |
| Experiment 1-12 | 6.31 | 0.63 | 5.70 | 78.46 | 0.59 | 5.93 | 1.50 | 0.68 | 0.07 | 0.11 | 0.050 |
| Experiment 1-13 | 8.90 | 0.89 | 8.05 | 73.80 | 0.56 | 5.58 | 1.41 | 0.64 | 0.07 | 0.10 | 0.050 |
| Experiment 1-14 | 8.85 | 0.91 | 8.02 | 73.52 | 0.55 | 5.93 | 1.41 | 0.64 | 0.07 | 0.10 | 0.051 |
| Experiment 1-15 | 9.15 | 0.92 | 8.31 | 76.00 | 0.57 | 3.83 | 0.38 | 0.66 | 0.07 | 0.10 | 0.050 |
| Experiment 1-16 | 9.17 | 0.92 | 8.25 | 75.86 | 0.57 | 3.82 | 0.57 | 0.66 | 0.07 | 0.10 | 0.050 |
| Experiment 1-17 | 9.12 | 0.93 | 8.23 | 75.60 | 0.57 | 4.57 | 0.15 | 0.66 | 0.07 | 0.10 | 0.051 |
| Experiment 1-18 | 9.08 | 0.93 | 8.23 | 75.42 | 0.57 | 4.56 | 0.38 | 0.66 | 0.07 | 0.10 | 0.051 |
| Experiment 1-19 | 8.94 | 0.90 | 8.08 | 74.13 | 0.56 | 4.48 | 2.09 | 0.64 | 0.07 | 0.10 | 0.050 |
| Experiment 1-20 | 8.93 | 0.89 | 8.07 | 74.02 | 0.56 | 4.47 | 2.24 | 0.64 | 0.07 | 0.10 | 0.050 |

TABLE 1-continued

| | | | | | | | | | | | |
|---|---|---|---|---|---|---|---|---|---|---|---|
| Experiment 1-21 | 8.88 | 0.89 | 8.06 | 73.72 | 0.56 | 5.01 | 2.08 | 0.64 | 0.07 | 0.10 | 0.050 |
| Experiment 1-22 | 9.00 | 0.92 | 8.11 | 74.57 | 0.56 | 5.64 | 0.38 | 0.65 | 0.07 | 0.10 | 0.051 |

| | y | a/b | c/b | d/b | (a − 2c)/(b − 14c) | d/(b − 14c) | |
|---|---|---|---|---|---|---|---|
| Experiment 1-1 | 0.450 | 0.24 | 0.045 | 0.019 | 0.41 | 0.051 | Comparative example |
| Experiment 1-2 | 0.450 | 0.16 | 0.050 | 0.019 | 0.20 | 0.063 | Example |
| Experiment 1-3 | 0.452 | 0.18 | 0.050 | 0.019 | 0.25 | 0.063 | Example |
| Experiment 1-4 | 0.451 | 0.24 | 0.050 | 0.019 | 0.47 | 0.063 | Example |
| Experiment 1-5 | 0.452 | 0.14 | 0.060 | 0.019 | 0.13 | 0.119 | Comparative example |
| Experiment 1-6 | 0.450 | 0.16 | 0.060 | 0.019 | 0.25 | 0.119 | Example |
| Experiment 1-7 | 0.450 | 0.28 | 0.060 | 0.019 | 1.00 | 0.119 | Example |
| Experiment 1-8 | 0.451 | 0.30 | 0.060 | 0.019 | 1.13 | 0.119 | Comparative example |
| Experiment 1-9 | 0.450 | 0.28 | 0.066 | 0.019 | 2.00 | 0.257 | Example |
| Experiment 1-10 | 0.452 | 0.16 | 0.070 | 0.005 | 1.00 | 0.250 | Example |
| Experiment 1-11 | 0.450 | 0.28 | 0.070 | 0.019 | 7.00 | 0.950 | Example |
| Experiment 1-12 | 0.451 | 0.16 | 0.075 | 0.019 | −0.20 | −0.380 | Example |
| Experiment 1-13 | 0.451 | 0.24 | 0.075 | 0.019 | −1.80 | −0.380 | Example |
| Experiment 1-14 | 0.451 | 0.24 | 0.080 | 0.019 | −0.67 | −0.158 | Comparative example |
| Experiment 1-15 | 0.452 | 0.24 | 0.050 | 0.005 | 0.47 | 0.017 | Example |
| Experiment 1-16 | 0.450 | 0.24 | 0.050 | 0.008 | 0.47 | 0.025 | Example |
| Experiment 1-17 | 0.450 | 0.24 | 0.060 | 0.002 | 0.75 | 0.013 | Comparative example |
| Experiment 1-18 | 0.451 | 0.24 | 0.060 | 0.005 | 0.75 | 0.031 | Example |
| Experiment 1-19 | 0.451 | 0.24 | 0.060 | 0.028 | 0.75 | 0.175 | Example |
| Experiment 1-20 | 0.451 | 0.24 | 0.060 | 0.030 | 0.75 | 0.188 | Comparative example |
| Experiment 1-21 | 0.452 | 0.24 | 0.067 | 0.028 | 1.88 | 0.500 | Example |
| Experiment 1-22 | 0.450 | 0.24 | 0.075 | 0.005 | −1.80 | −0.100 | Example |

Regarding the R-T-B based sintered magnets obtained in Experiments 1-1 to 1-22, the polished cross section along a plane including the orientation axis was observed by SEM, the observed image was read by an image analysis software, and an average crystal grain size D50 of the main phase crystal grains and a grain size distribution (D90−D10)/D50 were evaluated. Results are shown in Table 2.

Regarding the R-T-B based sintered magnets obtained in Experiments 1-1 to 1-22, the polished cross section along a plane including the orientation axis was observed by SEM and EPMA, and grain boundary phases were identified. Also, the composition of main phase and the composition of each grain boundary phase on the polished cross section were evaluated. The observed image was read by an image analysis software. The evaluated results of the area ratio of each grain boundary phase and a grain boundary phase coverage are shown in Table 2.

The magnetic properties of the R-T-B based sintered magnets obtained in Experiments 1-1 to 1-22 were measured by a BH tracer. As the magnetic properties, at room temperature (23° C.), the above defined minimum magnetizing field Hmag, a remanence $Br\_{Hmag}$ of a minor curve measured in the same minimum magnetizing field Hmag, a coercivity $HcJ\_{Hmag}$, a squareness ratio $Hk/HcJ\_{Hmag}$, and an indicator $H\_{50\%\ Js}/HcJ\_{Hmag}$ of the minor curve flatness were evaluated. Further, a rate of decrease β of coercivity at high temperature (180° C.) with respect to the coercivity at room temperature; and a rate of decrease γ of minor curve flatness at high temperature (180° C.) with respect to the minor curve flatness at room temperature, were obtained. Results are shown in Table 3.

TABLE 2

| | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) | |
|---|---|---|---|---|---|---|---|
| Experiment 1-1 | 2.04 | 1.24 | 56.9 | 9.8 | 72.2 | 18.0 | Comparative example |
| Experiment 1-2 | 1.83 | 1.19 | 70.7 | 9.6 | 81.4 | 9.0 | Example |
| Experiment 1-3 | 1.83 | 1.16 | 71.1 | 14.3 | 60.0 | 25.7 | Example |
| Experiment 1-4 | 1.83 | 1.13 | 72.6 | 30.2 | 48.9 | 20.9 | Example |
| Experiment 1-5 | 1.82 | 0.97 | 54.2 | 2.3 | 87.9 | 9.8 | Comparative example |
| Experiment 1-6 | 1.81 | 0.95 | 73.8 | 15.1 | 59.4 | 25.5 | Example |
| Experiment 1-7 | 1.81 | 0.95 | 86.8 | 23.6 | 15.3 | 61.1 | Example |
| Experiment 1-8 | 1.82 | 0.96 | 76.4 | 9.7 | 9.0 | 81.3 | Comparative example |
| Experiment 1-9 | 1.82 | 1.01 | 84.6 | 11.8 | 44.1 | 44.1 | Example |
| Experiment 1-10 | 1.82 | 1.12 | 71.2 | 20.0 | 40.0 | 40.0 | Example |
| Experiment 1-11 | 1.82 | 1.07 | 78.8 | 9.6 | 18.1 | 72.3 | Example |
| Experiment 1-12 | 1.83 | 1.15 | 70.2 | 8.7 | 36.5 | 54.8 | Example |

TABLE 2-continued

|  | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) |  |
|---|---|---|---|---|---|---|---|
| Experiment 1-13 | 1.83 | 1.13 | 73.5 | 9.4 | 18.1 | 72.5 | Example |
| Experiment 1-14 | 2.05 | 1.17 | 47.7 | 5.4 | 9.5 | 85.1 | Comparative example |
| Experiment 1-15 | 1.83 | 1.17 | 71.0 | 9.7 | 72.2 | 18.1 | Example |
| Experiment 1-16 | 1.83 | 1.16 | 71.3 | 20.5 | 55.7 | 23.9 | Example |
| Experiment 1-17 | 1.92 | 1.81 | 63.1 | 2.4 | 87.8 | 9.8 | Comparative example |
| Experiment 1-18 | 1.81 | 0.98 | 82.2 | 22.8 | 54.0 | 23.2 | Example |
| Experiment 1-19 | 1.81 | 0.99 | 77.8 | 24.9 | 22.5 | 52.6 | Example |
| Experiment 1-20 | 1.93 | 1.18 | 66.3 | 9.9 | 9.0 | 81.1 | Comparative example |
| Experiment 1-21 | 1.82 | 1.02 | 74.5 | 10.0 | 20.0 | 70.0 | Example |
| Experiment 1-22 | 1.83 | 1.18 | 70.6 | 5.8 | 28.3 | 65.9 | Example |

TABLE 3

|  | Minimum magnetizing field $H_{mag}$ (kOe) | Remanence $Br_{\_Hmag}$ (KG) | Coercivity $HcJ_{\_Hmag}$ (kOe) | Squareness ratio $Hk_{\_Hmag}/HcJ_{\_Hmag}$ (%) | Minor curve flatness $H_{\_50\% Js}/HcJ_{\_Hmag}$ (%) | Rate of decrease of coercive force δ (%/° C.) | Rate of decrease of minor curve flatness ε (%/° C.) |  |
|---|---|---|---|---|---|---|---|---|
| Experiment 1-1 | 3.0 | 9.3 | 1.5 | 75.7 | 19.3 | 0.48 | 0.33 | Comparative example |
| Experiment 1-2 | 4.0 | 10.8 | 2.0 | 80.0 | 51.1 | 0.51 | 0.35 | Example |
| Experiment 1-3 | 4.0 | 10.1 | 2.2 | 81.1 | 51.8 | 0.45 | 0.29 | Example |
| Experiment 1-4 | 4.0 | 9.6 | 2.5 | 82.9 | 52.5 | 0.40 | 0.27 | Example |
| Experiment 1-5 | 4.0 | 11.6 | 1.9 | 51.8 | 23.6 | 0.54 | 0.39 | Comparative example |
| Experiment 1-6 | 5.0 | 11.2 | 2.8 | 89.4 | 55.4 | 0.44 | 0.27 | Example |
| Experiment 1-7 | 7.0 | 9.5 | 4.6 | 90.6 | 58.2 | 0.43 | 0.25 | Example |
| Experiment 1-8 | 8.0 | 9.2 | 5.1 | 81.6 | 51.0 | 0.47 | 0.31 | Comparative example |
| Experiment 1-9 | 7.0 | 10.2 | 4.3 | 87.7 | 56.5 | 0.44 | 0.28 | Example |
| Experiment 1-10 | 5.0 | 11.5 | 2.4 | 81.5 | 51.9 | 0.45 | 0.30 | Example |
| Experiment 1-11 | 7.0 | 10.9 | 4.0 | 82.3 | 52.3 | 0.46 | 0.31 | Example |
| Experiment 1-12 | 4.0 | 12.9 | 2.0 | 80.3 | 50.0 | 0.49 | 0.34 | Example |
| Experiment 1-13 | 5.0 | 12.2 | 2.6 | 81.9 | 54.6 | 0.47 | 0.33 | Example |
| Experiment 1-14 | 4.0 | 12.4 | 1.3 | 74.2 | 21.7 | 0.52 | 0.35 | Comparative example |
| Experiment 1-15 | 4.0 | 9.7 | 2.0 | 80.4 | 50.2 | 0.52 | 0.32 | Example |
| Experiment 1-16 | 4.0 | 9.7 | 2.2 | 81.3 | 51.2 | 0.45 | 0.30 | Example |
| Experiment 1-17 | 8.0 | 10.0 | 2.5 | 77.7 | 10.1 | 0.47 | 0.33 | Comparative example |
| Experiment 1-18 | 5.0 | 10.0 | 3.2 | 83.3 | 57.3 | 0.43 | 0.28 | Example |
| Experiment 1-19 | 6.0 | 9.8 | 4.2 | 87.7 | 62.8 | 0.42 | 0.27 | Example |
| Experiment 1-20 | 6.0 | 9.6 | 3.9 | 82.1 | 49.2 | 0.46 | 0.35 | Comparative example |
| Experiment 1-21 | 6.0 | 10.5 | 3.9 | 85.0 | 55.5 | 0.45 | 0.30 | Example |
| Experiment 1-22 | 4.0 | 12.1 | 2.0 | 80.7 | 51.5 | 0.51 | 0.34 | Example |

The R-T-B based sintered magnets of Experiments 1-2 to 1-4, 1-6, 1-7, and 1-9 to 1-13 satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field. Therefore, it was confirmed that within the range of 0.16≤a/b≤0.28, a high remanence, a low coercivity, and high squareness ratio and minor curve flatness after magnetized in a low magnetizing field were attained.

The R-T-B based sintered magnets of Experiments 1-2 to 1-4, and 1-13 satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field. Therefore, it was confirmed that within the range of 0.050≤c/b≤0.075, a high remanence, a low coercivity, and high squareness ratio and minor curve flatness after magnetized in a low magnetizing field were attained.

The R-T-B based sintered magnets of Experiments 1-15, 1-16, 1-18, 1-19, 1-21, and 1-22 satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field. Therefore, it was confirmed that within the range of 0.005≤d/b≤0.028, a high remanence, a low coercivity, and high squareness ratio and minor curve flatness after magnetized in a low magnetizing field were attained.

(Experiment 2)

Raw materials were blended to obtain R-T-B based sintered magnets having a composition shown in Table 4, and as similar to Experiment 1, casting of a raw material alloy, hydrogen crush treatment, fine pulverization by a jet mill, molding, sintering, and aging treatment were performed to each composition.

Compositional analysis was performed to the R-T-B based sintered magnets of Experiments 2-1 to 2-38 as similar to Experiment 1, and the results are shown in Table 4. Also, from the results of the compositional analysis, x and y were calculated, then the relationship between x and y was plotted in FIG. 1. Numbers 1 to 38 in FIG. 1 corresponds to Experiments 2-1 to 2-38.

The average grain size of the main phase crystal grains, the grain size distribution, the grain boundary phase coverage, an area ratio of the R-T-M phase, an area ratio of the T-rich phase, and an area ratio of the R-rich phase were evaluated and the results are shown in Table 5. Also, the results of the measured magnetic properties are shown in Table 6.

TABLE 4

| | Magnet composition (at %) | | | | | | | | | | |
|---|---|---|---|---|---|---|---|---|---|---|---|
| | Nd | Sm | Y | Fe | Co | B | Ga | Al | Cu | Zr | x |
| Experiment 2-1 | 11.09 | 0.00 | 6.80 | 74.93 | 0.57 | 4.51 | 1.40 | 0.55 | 0.05 | 0.09 | 0.000 |
| Experiment 2-2 | 9.38 | 0.00 | 8.71 | 74.71 | 0.57 | 4.52 | 1.41 | 0.54 | 0.07 | 0.10 | 0.000 |
| Experiment 2-3 | 7.61 | 0.00 | 10.51 | 74.66 | 0.56 | 4.56 | 1.38 | 0.58 | 0.08 | 0.07 | 0.000 |
| Experiment 2-4 | 17.24 | 0.18 | 0.00 | 75.18 | 0.56 | 4.54 | 1.47 | 0.66 | 0.06 | 0.10 | 0.010 |
| Experiment 2-5 | 12.32 | 0.20 | 5.44 | 74.71 | 0.55 | 4.59 | 1.35 | 0.65 | 0.07 | 0.10 | 0.011 |
| Experiment 2-6 | 10.24 | 0.17 | 7.00 | 75.19 | 0.55 | 4.54 | 1.47 | 0.66 | 0.06 | 0.10 | 0.010 |
| Experiment 2-7 | 8.61 | 0.20 | 9.17 | 74.77 | 0.55 | 4.52 | 1.36 | 0.65 | 0.07 | 0.09 | 0.011 |
| Experiment 2-8 | 7.00 | 0.18 | 10.77 | 74.63 | 0.56 | 4.59 | 1.46 | 0.65 | 0.07 | 0.09 | 0.010 |
| Experiment 2-9 | 16.97 | 0.44 | 0.00 | 75.12 | 0.55 | 4.62 | 1.47 | 0.66 | 0.07 | 0.10 | 0.025 |
| Experiment 2-10 | 13.73 | 0.45 | 3.77 | 74.63 | 0.55 | 4.59 | 1.46 | 0.65 | 0.07 | 0.10 | 0.025 |
| Experiment 2-11 | 11.92 | 0.47 | 5.59 | 74.76 | 0.56 | 4.52 | 1.36 | 0.65 | 0.07 | 0.09 | 0.026 |
| Experiment 2-12 | 8.97 | 0.44 | 8.02 | 75.21 | 0.55 | 4.62 | 1.36 | 0.66 | 0.07 | 0.10 | 0.025 |
| Experiment 2-13 | 6.68 | 0.45 | 10.31 | 75.27 | 0.55 | 4.55 | 1.36 | 0.66 | 0.06 | 0.10 | 0.026 |
| Experiment 2-14 | 4.89 | 0.45 | 12.63 | 74.71 | 0.56 | 4.59 | 1.35 | 0.65 | 0.07 | 0.09 | 0.025 |
| Experiment 2-15 | 17.06 | 0.90 | 0.00 | 74.69 | 0.55 | 4.51 | 1.46 | 0.65 | 0.06 | 0.10 | 0.050 |
| Experiment 2-16 | 14.78 | 0.89 | 1.74 | 75.13 | 0.56 | 4.62 | 1.47 | 0.66 | 0.06 | 0.10 | 0.051 |
| Experiment 2-17 | 11.62 | 0.90 | 5.44 | 74.71 | 0.55 | 4.59 | 1.35 | 0.65 | 0.07 | 0.10 | 0.050 |
| Experiment 2-18 | 9.02 | 0.91 | 8.04 | 74.69 | 0.56 | 4.50 | 1.46 | 0.65 | 0.07 | 0.10 | 0.050 |
| Experiment 2-19 | 6.28 | 0.92 | 10.79 | 74.76 | 0.56 | 4.52 | 1.36 | 0.65 | 0.07 | 0.09 | 0.051 |
| Experiment 2-20 | 16.59 | 1.36 | 0.00 | 74.64 | 0.55 | 4.59 | 1.46 | 0.65 | 0.06 | 0.09 | 0.076 |
| Experiment 2-21 | 14.62 | 1.37 | 2.00 | 74.77 | 0.55 | 4.52 | 1.36 | 0.65 | 0.07 | 0.10 | 0.076 |
| Experiment 2-22 | 11.14 | 1.35 | 5.46 | 74.62 | 0.56 | 4.59 | 1.46 | 0.65 | 0.07 | 0.10 | 0.075 |
| Experiment 2-23 | 9.26 | 1.35 | 7.37 | 74.77 | 0.55 | 4.52 | 1.36 | 0.65 | 0.06 | 0.10 | 0.075 |
| Experiment 2-24 | 7.47 | 1.35 | 9.15 | 74.71 | 0.56 | 4.59 | 1.35 | 0.65 | 0.07 | 0.09 | 0.075 |
| Experiment 2-25 | 5.94 | 1.35 | 10.66 | 74.63 | 0.56 | 4.59 | 1.46 | 0.65 | 0.06 | 0.10 | 0.075 |
| Experiment 2-26 | 15.66 | 1.78 | 0.00 | 75.27 | 0.55 | 4.55 | 1.36 | 0.66 | 0.07 | 0.09 | 0.102 |
| Experiment 2-27 | 14.24 | 1.89 | 1.83 | 74.68 | 0.56 | 4.51 | 1.46 | 0.65 | 0.07 | 0.10 | 0.105 |
| Experiment 2-28 | 10.68 | 1.81 | 5.46 | 74.63 | 0.56 | 4.59 | 1.46 | 0.65 | 0.07 | 0.09 | 0.101 |
| Experiment 2-29 | 8.86 | 1.80 | 7.31 | 74.69 | 0.55 | 4.51 | 1.46 | 0.65 | 0.06 | 0.10 | 0.100 |
| Experiment 2-30 | 7.14 | 1.79 | 9.01 | 74.63 | 0.55 | 4.59 | 1.46 | 0.65 | 0.07 | 0.10 | 0.100 |
| Experiment 2-31 | 5.38 | 1.79 | 10.77 | 74.63 | 0.56 | 4.59 | 1.46 | 0.65 | 0.06 | 0.10 | 0.100 |
| Experiment 2-32 | 15.24 | 2.18 | 0.00 | 75.17 | 0.56 | 4.54 | 1.47 | 0.66 | 0.07 | 0.10 | 0.125 |
| Experiment 2-33 | 11.94 | 2.25 | 3.77 | 74.69 | 0.55 | 4.51 | 1.46 | 0.65 | 0.06 | 0.10 | 0.125 |
| Experiment 2-34 | 10.33 | 2.25 | 5.39 | 74.68 | 0.56 | 4.51 | 1.46 | 0.65 | 0.07 | 0.09 | 0.125 |
| Experiment 2-35 | 8.35 | 2.24 | 7.36 | 74.69 | 0.55 | 4.51 | 1.46 | 0.65 | 0.07 | 0.10 | 0.125 |
| Experiment 2-36 | 14.81 | 2.61 | 0.00 | 75.19 | 0.55 | 4.54 | 1.47 | 0.66 | 0.06 | 0.10 | 0.150 |
| Experiment 2-37 | 13.47 | 2.69 | 1.80 | 74.70 | 0.55 | 4.51 | 1.46 | 0.65 | 0.06 | 0.09 | 0.150 |
| Experiment 2-38 | 15.05 | 2.91 | 0.00 | 74.69 | 0.55 | 4.51 | 1.46 | 0.65 | 0.07 | 0.10 | 0.162 |

| | y | a/b | c/b | d/b | (a − 2c)/(b − 14c) | d/(b − 14c) | |
|---|---|---|---|---|---|---|---|
| Experiment 2-1 | 0.380 | 0.24 | 0.060 | 0.019 | 0.72 | 0.113 | Comparative example |
| Experiment 2-2 | 0.481 | 0.24 | 0.060 | 0.019 | 0.75 | 0.118 | Comparative example |
| Experiment 2-3 | 0.580 | 0.24 | 0.061 | 0.018 | 0.79 | 0.121 | Comparative example |
| Experiment 2-4 | 0.000 | 0.23 | 0.060 | 0.019 | 0.69 | 0.121 | Comparative example |
| Experiment 2-5 | 0.303 | 0.24 | 0.061 | 0.018 | 0.80 | 0.123 | Comparative example |
| Experiment 2-6 | 0.402 | 0.23 | 0.060 | 0.019 | 0.69 | 0.121 | Example |
| Experiment 2-7 | 0.510 | 0.24 | 0.060 | 0.018 | 0.74 | 0.113 | Example |
| Experiment 2-8 | 0.600 | 0.24 | 0.061 | 0.019 | 0.80 | 0.133 | Example |
| Experiment 2-9 | 0.000 | 0.23 | 0.061 | 0.019 | 0.74 | 0.133 | Comparative example |
| Experiment 2-10 | 0.210 | 0.24 | 0.061 | 0.019 | 0.80 | 0.133 | Comparative example |

TABLE 4-continued

|  |  |  |  |  |  |  |  |
|---|---|---|---|---|---|---|---|
| Experiment 2-11 | 0.311 | 0.24 | 0.060 | 0.018 | 0.74 | 0.113 | Example |
| Experiment 2-12 | 0.460 | 0.23 | 0.061 | 0.018 | 0.74 | 0.123 | Example |
| Experiment 2-13 | 0.591 | 0.23 | 0.060 | 0.018 | 0.69 | 0.113 | Example |
| Experiment 2-14 | 0.703 | 0.24 | 0.061 | 0.018 | 0.80 | 0.123 | Comparative example |
| Experiment 2-15 | 0.000 | 0.24 | 0.060 | 0.019 | 0.74 | 0.121 | Example |
| Experiment 2-16 | 0.100 | 0.23 | 0.061 | 0.019 | 0.74 | 0.133 | Example |
| Experiment 2-17 | 0.303 | 0.24 | 0.061 | 0.018 | 0.80 | 0.123 | Example |
| Experiment 2-18 | 0.448 | 0.24 | 0.060 | 0.019 | 0.73 | 0.119 | Example |
| Experiment 2-19 | 0.600 | 0.24 | 0.060 | 0.018 | 0.74 | 0.113 | Example |
| Experiment 2-20 | 0.000 | 0.24 | 0.061 | 0.019 | 0.80 | 0.133 | Example |
| Experiment 2-21 | 0.111 | 0.24 | 0.060 | 0.018 | 0.74 | 0.113 | Example |
| Experiment 2-22 | 0.304 | 0.24 | 0.061 | 0.019 | 0.80 | 0.133 | Example |
| Experiment 2-23 | 0.410 | 0.24 | 0.060 | 0.018 | 0.74 | 0.113 | Example |
| Experiment 2-24 | 0.509 | 0.24 | 0.061 | 0.018 | 0.80 | 0.123 | Example |
| Experiment 2-25 | 0.594 | 0.24 | 0.061 | 0.019 | 0.80 | 0.133 | Example |
| Experiment 2-26 | 0.000 | 0.23 | 0.060 | 0.018 | 0.69 | 0.113 | Example |
| Experiment 2-27 | 0.102 | 0.24 | 0.060 | 0.019 | 0.74 | 0.121 | Example |
| Experiment 2-28 | 0.304 | 0.24 | 0.061 | 0.019 | 0.80 | 0.133 | Example |
| Experiment 2-29 | 0.407 | 0.24 | 0.060 | 0.019 | 0.74 | 0.121 | Example |
| Experiment 2-30 | 0.502 | 0.24 | 0.061 | 0.019 | 0.80 | 0.133 | Example |
| Experiment 2-31 | 0.600 | 0.24 | 0.061 | 0.019 | 0.80 | 0.133 | Example |
| Experiment 2-32 | 0.000 | 0.23 | 0.060 | 0.019 | 0.69 | 0.121 | Example |
| Experiment 2-33 | 0.210 | 0.24 | 0.060 | 0.019 | 0.74 | 0.121 | Example |
| Experiment 2-34 | 0.300 | 0.24 | 0.060 | 0.019 | 0.74 | 0.121 | Example |
| Experiment 2-35 | 0.410 | 0.24 | 0.060 | 0.019 | 0.74 | 0.121 | Comparative example |
| Experiment 2-36 | 0.000 | 0.23 | 0.060 | 0.019 | 0.69 | 0.121 | Example |
| Experiment 2-37 | 0.100 | 0.24 | 0.060 | 0.019 | 0.74 | 0.121 | Comparative example |
| Experiment 2-38 | 0.000 | 0.24 | 0.060 | 0.019 | 0.74 | 0.121 | Comparative example |

TABLE 5

|  | Average crystal grain size D50 (μm) | Grain size distribution (D90 − D10)/ D50 | Grain boundary phase coverage (%) | Area ratio of R-T-M phase (%) | Area ratio of T-rich phase (%) | Area ratio of R-rich phase (%) |  |
|---|---|---|---|---|---|---|---|
| Experiment 2-1 | 1.83 | 0.93 | 92.0 | 71.2 | 0.0 | 28.8 | Comparative example |
| Experiment 2-2 | 1.81 | 0.94 | 93.8 | 69.0 | 0.0 | 31.0 | Comparative example |
| Experiment 2-3 | 1.81 | 0.94 | 91.0 | 55.7 | 0.0 | 44.3 | Comparative example |
| Experiment 2-4 | 1.81 | 0.95 | 90.2 | 68.5 | 0.0 | 31.5 | Comparative example |
| Experiment 2-5 | 1.81 | 0.94 | 91.1 | 69.3 | 0.0 | 30.7 | Comparative example |
| Experiment 2-6 | 1.82 | 0.93 | 91.8 | 70.9 | 0.0 | 29.1 | Example |
| Experiment 2-7 | 1.82 | 0.94 | 93.3 | 68.7 | 0.0 | 31.3 | Example |
| Experiment 2-8 | 1.82 | 0.96 | 90.8 | 55.4 | 0.0 | 44.6 | Example |
| Experiment 2-9 | 1.81 | 0.94 | 90.1 | 68.2 | 0.0 | 31.8 | Comparative example |
| Experiment 2-10 | 1.83 | 0.93 | 90.5 | 68.8 | 0.0 | 31.2 | Comparative example |
| Experiment 2-11 | 1.82 | 0.94 | 90.7 | 69.0 | 0.0 | 31.0 | Example |
| Experiment 2-12 | 1.81 | 0.93 | 93.1 | 68.2 | 0.0 | 31.8 | Example |
| Experiment 2-13 | 1.82 | 0.95 | 90.5 | 55.2 | 0.0 | 44.8 | Example |
| Experiment 2-14 | 1.81 | 0.96 | 77.1 | 17.3 | 40.8 | 41.9 | Comparative example |
| Experiment 2-15 | 1.82 | 0.94 | 90.0 | 67.6 | 0.0 | 32.4 | Example |
| Experiment 2-16 | 1.82 | 0.94 | 90.3 | 68.3 | 0.0 | 31.7 | Example |
| Experiment 2-17 | 1.81 | 0.94 | 90.4 | 68.7 | 0.0 | 31.3 | Example |
| Experiment 2-18 | 1.81 | 0.94 | 94.1 | 67.5 | 0.0 | 32.5 | Example |
| Experiment 2-19 | 1.82 | 0.96 | 90.0 | 54.8 | 0.0 | 45.2 | Example |
| Experiment 2-20 | 1.81 | 0.93 | 89.8 | 67.3 | 0.0 | 32.7 | Example |
| Experiment 2-21 | 1.82 | 0.94 | 90.1 | 67.8 | 0.0 | 32.2 | Example |
| Experiment 2-22 | 1.82 | 0.94 | 90.2 | 68.5 | 0.0 | 31.5 | Example |
| Experiment 2-23 | 1.81 | 0.95 | 92.3 | 70.3 | 0.0 | 29.7 | Example |
| Experiment 2-24 | 1.82 | 0.96 | 92.6 | 66.7 | 0.0 | 33.3 | Example |
| Experiment 2-25 | 1.82 | 0.96 | 89.2 | 53.7 | 0.0 | 46.3 | Example |
| Experiment 2-26 | 1.82 | 0.94 | 89.7 | 66.8 | 0.0 | 33.2 | Example |
| Experiment 2-27 | 1.82 | 0.95 | 89.9 | 67.1 | 0.0 | 32.9 | Example |
| Experiment 2-28 | 1.81 | 0.95 | 90.1 | 68.2 | 0.0 | 31.8 | Example |
| Experiment 2-29 | 1.81 | 0.95 | 90.1 | 70.1 | 0.0 | 29.9 | Example |

TABLE 5-continued

|  | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) | |
|---|---|---|---|---|---|---|---|
| Experiment 2-30 | 1.81 | 0.95 | 90.2 | 65.0 | 0.0 | 35.0 | Example |
| Experiment 2-31 | 1.82 | 0.96 | 88.2 | 52.9 | 0.0 | 47.1 | Example |
| Experiment 2-32 | 1.81 | 0.95 | 89.5 | 66.4 | 0.0 | 33.6 | Example |
| Experiment 2-33 | 1.82 | 0.95 | 89.7 | 67.2 | 0.0 | 32.8 | Example |
| Experiment 2-34 | 1.82 | 0.95 | 88.2 | 67.8 | 0.0 | 32.2 | Example |
| Experiment 2-35 | 1.82 | 0.96 | 87.4 | 69.3 | 0.0 | 30.7 | Comparative example |
| Experiment 2-36 | 1.83 | 0.95 | 88.5 | 66.9 | 0.0 | 33.1 | Example |
| Experiment 2-37 | 1.83 | 0.95 | 88.8 | 67.1 | 0.0 | 32.9 | Comparative example |
| Experiment 2-38 | 1.83 | 0.95 | 84.3 | 66.4 | 0.0 | 33.6 | Comparative example |

TABLE 6

|  | Minimum magnetizing field Hmag (kOe) | Remanence $Br\_{Hmag}$ (KG) | Coercivity $HcJ\_{Hmag}$ (kOe) | Squareness ratio $Hk\_{Hmag}/HcJ\_{Hmag}$ (%) | Minor curve flatness $H\_{50\% Js}/HcJ\_{Hmag}$ (%) | Rate of decrease of coercive force δ (%/°C.) | Rate of decrease of minor curve flatness ε (%/°C.) | |
|---|---|---|---|---|---|---|---|---|
| Experiment 2-1 | 8.0 | 10.3 | 7.0 | 95.1 | 87.3 | 0.38 | 0.19 | Comparative example |
| Experiment 2-2 | 8.0 | 9.8 | 6.4 | 94.3 | 87.1 | 0.34 | 0.16 | Comparative example |
| Experiment 2-3 | 8.0 | 9.4 | 5.3 | 95.1 | 81.3 | 0.36 | 0.18 | Comparative example |
| Experiment 2-4 | 15.0 | 12.6 | 13.1 | 86.8 | 89.4 | 0.49 | 0.35 | Comparative example |
| Experiment 2-5 | 12.0 | 11.3 | 8.0 | 94.4 | 82.3 | 0.44 | 0.31 | Comparative example |
| Experiment 2-6 | 7.0 | 10.6 | 5.0 | 94.4 | 80.2 | 0.37 | 0.19 | Example |
| Experiment 2-7 | 7.0 | 10.1 | 4.8 | 93.7 | 80.0 | 0.34 | 0.16 | Example |
| Experiment 2-8 | 6.0 | 9.6 | 4.1 | 94.7 | 74.6 | 0.36 | 0.18 | Example |
| Experiment 2-9 | 14.0 | 13.2 | 10.6 | 85.3 | 88.8 | 0.47 | 0.32 | Comparative example |
| Experiment 2-10 | 10.0 | 12.2 | 7.4 | 90.0 | 81.2 | 0.44 | 0.28 | Comparative example |
| Experiment 2-11 | 7.0 | 11.7 | 5.0 | 93.7 | 78.8 | 0.39 | 0.22 | Example |
| Experiment 2-12 | 7.0 | 10.4 | 4.7 | 93.3 | 73.3 | 0.34 | 0.16 | Example |
| Experiment 2-13 | 7.0 | 10.1 | 3.6 | 92.8 | 67.8 | 0.37 | 0.20 | Example |
| Experiment 2-14 | 3.0 | 8.3 | 1.1 | 80.0 | 50.0 | 0.42 | 0.21 | Comparative example |
| Experiment 2-15 | 7.0 | 13.0 | 5.0 | 84.3 | 87.5 | 0.45 | 0.25 | Example |
| Experiment 2-16 | 7.0 | 12.5 | 4.6 | 85.4 | 84.0 | 0.44 | 0.24 | Example |
| Experiment 2-17 | 7.0 | 11.4 | 4.3 | 92.9 | 73.4 | 0.34 | 0.16 | Example |
| Experiment 2-18 | 6.0 | 9.9 | 4.0 | 91.7 | 68.6 | 0.36 | 0.20 | Example |
| Experiment 2-19 | 4.0 | 9.8 | 2.6 | 91.4 | 63.8 | 0.38 | 0.23 | Example |
| Experiment 2-20 | 6.0 | 12.6 | 3.8 | 83.1 | 86.8 | 0.39 | 0.21 | Example |
| Experiment 2-21 | 6.0 | 12.0 | 3.5 | 84.7 | 83.1 | 0.36 | 0.20 | Example |
| Experiment 2-22 | 6.0 | 11.4 | 3.2 | 91.2 | 72.4 | 0.37 | 0.20 | Example |
| Experiment 2-23 | 5.0 | 10.8 | 2.9 | 90.9 | 66.8 | 0.38 | 0.23 | Example |
| Experiment 2-24 | 5.0 | 10.0 | 2.4 | 90.8 | 61.8 | 0.39 | 0.26 | Example |
| Experiment 2-25 | 4.0 | 9.6 | 1.7 | 90.4 | 56.2 | 0.40 | 0.27 | Example |
| Experiment 2-26 | 5.0 | 12.1 | 3.1 | 81.8 | 84.8 | 0.34 | 0.16 | Example |
| Experiment 2-27 | 5.0 | 11.6 | 2.7 | 82.3 | 81.8 | 0.35 | 0.18 | Example |
| Experiment 2-28 | 4.0 | 11.1 | 1.8 | 90.8 | 70.5 | 0.39 | 0.24 | Example |
| Experiment 2-29 | 3.0 | 10.4 | 1.1 | 90.7 | 65.2 | 0.41 | 0.26 | Example |
| Experiment 2-30 | 2.0 | 9.8 | 0.8 | 90.5 | 60.3 | 0.44 | 0.28 | Example |
| Experiment 2-31 | 2.0 | 9.5 | 0.5 | 90.1 | 54.9 | 0.45 | 0.30 | Example |
| Experiment 2-32 | 4.0 | 11.8 | 1.9 | 80.9 | 82.4 | 0.39 | 0.22 | Example |
| Experiment 2-33 | 3.0 | 10.9 | 0.8 | 85.3 | 71.8 | 0.43 | 0.28 | Example |
| Experiment 2-34 | 2.0 | 10.6 | 0.5 | 90.0 | 68.4 | 0.44 | 0.29 | Example |
| Experiment 2-35 | 2.0 | 9.7 | 0.4 | 88.7 | 63.1 | 0.45 | 0.31 | Comparative example |
| Experiment 2-36 | 2.0 | 11.4 | 0.5 | 80.0 | 80.0 | 0.45 | 0.28 | Example |
| Experiment 2-37 | 1.0 | 9.4 | 0.2 | 73.7 | 77.1 | 0.45 | 0.31 | Comparative example |
| Experiment 2-38 | 1.0 | 10.2 | 0.2 | 67.6 | 78.3 | 0.46 | 0.32 | Comparative example |

As shown in Table 6, the R-T-B based sintered magnets of Experiments 2-6 to 2-8, 2-11 to 2-13, 2-15 to 2-34, and 2-36 (shown by black triangles in FIG. 1) satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field.

Therefore, in case x and y were within the range shown in FIG. 1, it was confirmed that a high remanence, a low coercivity, and high squareness ratio and minor curve flatness after magnetized in a low magnetizing field were attained.

Further, the R-T-B based sintered magnets of Experiments 2-6 to 2-8, 2-11 to 2-13, 2-15 to 2-34, and 2-36 (shown by black triangles in FIG. 1) had 0.45%/° C. or less of the rate of decrease of the coercivity and 0.30%/° C. or less of the rate of decrease of the minor curve flatness at high temperature.

Therefore, when c/b, (a−2c)/(b−14c), and d/(b−14c) were within the above-mentioned range and also when the grain boundary phase coverage, the area ratio of the R-T-M phase, the area ratio of the T-rich phase, and the area ratio of the R-rich phase were within the above-mentioned range, a high remanence, a low coercivity, and high squareness ratio and minor curve flatness after magnetized in a low magnetizing field were attained. Furthermore, it was confirmed that the rate of decrease of the coercivity and the rate of decrease of the minor curve flatness at high temperature were small.

Particularly, the R-T-B based sintered magnets of Experiments 2-6 to 2-8, 2-11 to 2-13, 2-17 to 2-19, 2-22 to 2-25, 2-28 to 2-31, and 2-34 satisfying y≥0.300 had even higher squareness ratio.

Also, the R-T-B based sintered magnets of Experiments 2-15, 2-16, 2-20, 2-21, 2-26, 2-27, 2-32, and 2-36 satisfying 0.000≤y≤0.111 had even higher remanence and minor curve flatness.

(Experiment 3)

Raw materials were blended to obtain R-T-B based sintered magnets having a composition shown in Table 7; and casting of a raw material alloy, hydrogen crush treatment, fine pulverization by a jet mill, molding, sintering, and aging treatment were performed to each composition as similar to Experiment 1 except for the conditions described below. Note that, for Experiment 3-7, casting of a raw material alloy, hydrogen crush treatment, fine pulverization by a jet mill, molding, sintering, and aging treatment were performed as similar to Experiment 1.

In the fine pulverization step, a classification condition of a jet mill was regulated so that the average grain size of the finely pulverized powder of Experiment 3-1 was 2.7 μm, Experiment 3-2 was 3.7 μm, and Experiment 3-3 was 4.7 μm. After the fine pulverization step, as similar to Experiment 1, the collected finely pulverized powder was poured into a jet mill once again to perform a classification for twice, thereby the classification accuracy was improved and a dispersion of grain size distribution was reduced. The R-T-B based sintered magnet was obtained as similar to Experiment 1 other than mentioned in above.

In Experiment 3-4, the R-T-B based sintered magnet was obtained by storing hydrogen in room temperature then heat treating at 300° C. under Ar atmosphere for 1 hour, followed by cooling to room temperature and heat treating for 1 hour again at 300° C. in vacuum, thereby hydrogen storage pulverization treatment was performed. Other than this, the R-T-B based sintered magnet was obtained as similar to Experiment 1. In Experiment 3-5, the R-T-B based sintered magnet was obtained by storing hydrogen to the raw material alloy in room temperature then heat treating at 300° C. under Ar atmosphere for 1 hour, followed by cooling to room temperature and heat treating for 1 hour again at 300° C. in vacuum; thereby hydrogen storage pulverization treatment was performed. Then, classification was performed once using a jet mill after fine pulverization. The R-T-B based sintered magnet of Experiment 3-5 was obtained as similar to Experiment 1 other than mentioned in above. In Experiment 3-6, hydrogen crush treatment was not carried out and a mechanical coarse crush was performed using a stamp mill. The R-T-B based sintered magnet of Experiment 3-6 was obtained as similar to Experiment 1 other than mentioned in above.

As similar to Experiment 1, the results of compositional analysis of the R-T-B based sintered magnets of Experiments 3-1 to 3-7 are shown in Table 7. Also, the average grain size of the main crystal grains, the grain size distribution, the grain boundary phase coverage, the area ratio of the R-T-M phase, the area ratio of the T-rich phase, and the area ratio of the R-rich phase were evaluated and the results are shown in Table 8. Also, the results of measurements of the magnetic properties are shown in Table 9.

TABLE 7

| | Magnet composition (at %) | | | | | | | | | | |
|---|---|---|---|---|---|---|---|---|---|---|---|
| | Nd | Sm | Y | Fe | Co | B | Ga | Al | Cu | Zr | x |
| Experiment 3-1 | 8.94 | 0.92 | 8.09 | 74.64 | 0.55 | 4.59 | 1.46 | 0.65 | 0.06 | 0.10 | 0.051 |
| Experiment 3-2 | 8.94 | 0.90 | 8.12 | 74.66 | 0.56 | 4.50 | 1.50 | 0.65 | 0.07 | 0.09 | 0.050 |
| Experiment 3-3 | 8.94 | 0.90 | 8.12 | 74.66 | 0.56 | 4.50 | 1.50 | 0.65 | 0.07 | 0.10 | 0.050 |
| Experiment 3-4 | 8.96 | 0.90 | 8.09 | 74.64 | 0.55 | 4.59 | 1.46 | 0.65 | 0.06 | 0.10 | 0.050 |
| Experiment 3-5 | 8.96 | 0.92 | 8.08 | 74.66 | 0.56 | 4.50 | 1.50 | 0.65 | 0.07 | 0.10 | 0.051 |
| Experiment 3-6 | 8.97 | 0.90 | 8.08 | 74.63 | 0.56 | 4.59 | 1.46 | 0.65 | 0.07 | 0.09 | 0.050 |
| Exoeriment 3-7 | 8.96 | 0.92 | 8.08 | 75.18 | 0.00 | 4.59 | 1.46 | 0.65 | 0.07 | 0.10 | 0.051 |

| | y | a/b | c/b | d/b | (a − 2c)/(b − 14c) | d/(b − 14c) | |
|---|---|---|---|---|---|---|---|
| Experiment 3-1 | 0.451 | 0.24 | 0.061 | 0.019 | 0.80 | 0.133 | Example |
| Experiment 3-2 | 0.452 | 0.24 | 0.060 | 0.020 | 0.73 | 0.123 | Example |
| Experiment 3-3 | 0.452 | 0.24 | 0.060 | 0.020 | 0.73 | 0.123 | Comparative example |
| Experiment 3-4 | 0.451 | 0.24 | 0.061 | 0.019 | 0.80 | 0.133 | Example |
| Experiment 3-5 | 0.450 | 0.24 | 0.060 | 0.020 | 0.73 | 0.123 | Example |
| Experiment 3-6 | 0.450 | 0.24 | 0.061 | 0.019 | 0.80 | 0.133 | Comparative example |
| Exoeriment 3-7 | 0.450 | 0.24 | 0.061 | 0.019 | 0.80 | 0.133 | Examole |

TABLE 8

|  | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) | |
|---|---|---|---|---|---|---|---|
| Experiment 3-1 | 2.99 | 0.96 | 93.8 | 67.4 | 0.0 | 32.6 | Example |
| Experiment 3-2 | 3.93 | 1.01 | 93.7 | 67.3 | 0.0 | 32.7 | Example |
| Experiment 3-3 | 4.87 | 1.03 | 93.5 | 67.3 | 0.0 | 32.7 | Comparative example |
| Experiment 3-4 | 1.81 | 1.20 | 94.1 | 67.2 | 0.0 | 32.8 | Example |
| Experiment 3-5 | 1.80 | 1.59 | 93.8 | 67.1 | 0.0 | 32.9 | Example |
| Experiment 3-6 | 1.81 | 2.11 | 93.7 | 66.8 | 0.0 | 33.2 | Comparative example |
| Experiment 3-7 | 1.81 | 0.94 | 94.1 | 67.4 | 0.0 | 32.6 | Example |

TABLE 9

|  | Minimum magnetizing field $H_{mag}$ (kOe) | Remanence $Br\_{Hmag}$ (KG) | Coercivity $HcJ\_{Hmag}$ (kOe) | Squareness ratio $Hk\_{Hmag}/HcJ\_{Hmag}$ (%) | Minor curve flatness $H\_{50\% Js}/HcJ\_{Hmag}$ (%) | Rate of decrease of coercive force δ (%/°C.) | Rate of decrease of minor curve flatness ε (%/°C.) | |
|---|---|---|---|---|---|---|---|---|
| Experiment 3-1 | 6.0 | 10.0 | 3.1 | 89.5 | 62.5 | 0.38 | 0.23 | Example |
| Experiment 3-2 | 5.0 | 10.4 | 2.0 | 86.8 | 53.7 | 0.4 | 0.26 | Example |
| Experiment 3-3 | 5.0 | 10.7 | 1.2 | 74.8 | 38.5 | 0.42 | 0.27 | Comparative example |
| Experiment 3-4 | 6.0 | 9.6 | 3.9 | 86.4 | 64.2 | 0.39 | 0.22 | Example |
| Experiment 3-5 | 6.0 | 9.7 | 3.9 | 84.8 | 60.7 | 0.39 | 0.23 | Example |
| Experiment 3-6 | 6.0 | 9.6 | 3.8 | 78.2 | 48.6 | 0.4 | 0.25 | Comparative example |
| Experiment 3-7 | 6.0 | 9.9 | 3.8 | 88.7 | 64.1 | 0.39 | 0.23 | Example |

According to Table 9, the R-T-B based sintered magnets of Experiments 3-1, 3-2, 3-4, 3-5, and 3-7 satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field. Also, the rate of decrease of the coercivity and the rate of decrease of the minor curve flatness at high temperature were small.

Therefore, when D50≤4.00 μm and also (D90−D10)/D50≤1.60 were satisfied, a high remanence, a low coercivity, and high squareness ratio and minor curve flatness after magnetized in a low magnetizing field were attained. Furthermore, it was confirmed that the rate of decrease of the coercivity and the rate of decrease of the minor curve flatness at high temperature were small. Also, even in case part of Fe is not substituted by Co, the same effects were confirmed.

(Experiment 4)

Raw materials were blended to obtain R-T-B based sintered magnets having a composition shown in Table 10, and as similar to Experiment 1, casting of a raw material alloy, hydrogen crush treatment, fine pulverization by a jet mill, molding, sintering, and aging treatment were performed to each composition.

Results of compositional analysis as similar to Experiment 1 of the R-T-B based sintered magnets of Experiments 4-1 to 4-5 are shown in Table 10. Also, the average grain size of the main crystal grains, the grain size distribution, the grain boundary phase coverage, the area ratio of R-T-M phase, the area ratio of T-rich phase, and the area ratio of R-rich phase were evaluated and the results are shown in Table 11. Also, the results of measurements of the magnetic properties are shown in Table 12.

TABLE 10

| | Magnet composition (at %) | | | | | | | | | | |
|---|---|---|---|---|---|---|---|---|---|---|---|
| | Nd | Sm | Y | Fe | Co | B | Ga | Al | Cu | Zr | x |
| Experiment 4-1 | 12.52 | 1.42 | 0.00 | 79.09 | 0.60 | 3.98 | 1.51 | 0.69 | 0.07 | 0.11 | 0.102 |
| Experiment 4-2 | 18.25 | 2.10 | 0.00 | 72.13 | 0.54 | 4.81 | 1.38 | 0.63 | 0.07 | 0.09 | 0.103 |
| Experiment 4-3 | 11.56 | 1.28 | 0.00 | 79.66 | 0.60 | 5.62 | 0.40 | 0.69 | 0.08 | 0.11 | 0.100 |
| Experiment 4-4 | 16.44 | 1.91 | 0.00 | 75.86 | 0.57 | 3.82 | 0.57 | 0.66 | 0.06 | 0.10 | 0.104 |
| Experiment 4-5 | 16.01 | 1.82 | 0.00 | 73.72 | 0.56 | 5.01 | 2.08 | 0.64 | 0.07 | 0.10 | 0.102 |

| | y | a/b | c/b | d/b | (a − 2c)/(b − 14c) | d/(b − 14c) | |
|---|---|---|---|---|---|---|---|
| Experiment 4-1 | 0.000 | 0.18 | 0.050 | 0.019 | 0.25 | 0.063 | Example |
| Experiment 4-2 | 0.000 | 0.28 | 0.066 | 0.019 | 2.00 | 0.257 | Example |
| Experiment 4-3 | 0.000 | 0.16 | 0.070 | 0.005 | 1.00 | 0.250 | Example |

TABLE 10-continued

| | | | | | | | |
|---|---|---|---|---|---|---|---|
| Experiment 4-4 | 0.000 | 0.24 | 0.050 | 0.008 | 0.47 | 0.025 | Example |
| Experiment 4-5 | 0.000 | 0.24 | 0.067 | 0.028 | 1.88 | 0.500 | Example |

TABLE 11

| | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) | |
|---|---|---|---|---|---|---|---|
| Experiment 4-1 | 1.85 | 1.16 | 81.3 | 14.5 | 58.7 | 26.8 | Example |
| Experiment 4-2 | 1.84 | 1.01 | 80.6 | 11.8 | 45.8 | 42.4 | Example |
| Experiment 4-3 | 1.84 | 1.12 | 81.4 | 20.3 | 40.3 | 39.4 | Example |
| Experiment 4-4 | 1.85 | 1.16 | 81.5 | 20.8 | 55.8 | 23.4 | Example |
| Experiment 4-5 | 1.84 | 1.02 | 85.2 | 10.4 | 20.6 | 69.0 | Example |

TABLE 12

| | Minimum magnetizing field $H_{mag}$ (kOe) | Remanence $Br\_{Hmag}$ (KG) | Coercivity $HcJ\_{Hmag}$ (kOe) | Squareness ratio $Hk\_{Hmag}/HcJ\_{Hmag}$ (%) | Minor curve flatness $H_{50\% Js}/HcJ\_{Hmag}$ (%) | Rate of decrease of coercive force δ (%/° C.) | Rate of decrease of minor curve flatness ε (%/° C.) | |
|---|---|---|---|---|---|---|---|---|
| Experiment 4-1 | 5.0 | 12.4 | 1.7 | 80.0 | 64.1 | 0.45 | 0.29 | Example |
| Experiment 4-2 | 7.0 | 12.5 | 3.3 | 83.7 | 69.9 | 0.44 | 0.28 | Example |
| Experiment 4-3 | 6.0 | 13.2 | 1.8 | 80.5 | 64.2 | 0.45 | 0.30 | Example |
| Experiment 4-4 | 5.0 | 12.2 | 1.7 | 80.1 | 63.3 | 0.45 | 0.30 | Example |
| Experiment 4-5 | 7.0 | 12.6 | 3.0 | 82.0 | 68.6 | 0.45 | 0.30 | Example |

According to Table 12, the R-T-B based sintered magnets of Experiments 4-1 to 4-5 satisfied 7.0 kOe or less of the minimum magnetizing field, 12 kG or more of the remanence at the minimum magnetizing field, and 0.5 kOe or more and 5.0 kOe or less of the coercivity; and also had high squareness ratio and minor curve flatness at the minimum magnetizing field. Also, the rate of decrease of the coercivity and the rate of decrease of the minor curve flatness at high temperature were small.

Therefore, in case 0.000≤y≤0.111 was satisfied, a high remanence, a low coercivity, and high squareness ratio and minor curve flatness after magnetized in a low magnetizing field were attained. Furthermore, it was confirmed that the rate of decrease of the coercivity and the rate of decrease of the minor curve flatness at high temperature were small.

(Experiment 5)

Raw materials were blended to obtain R-T-B based sintered magnets having a composition shown in Table 13, and as similar to Experiment 1, casting of a raw material alloy, a hydrogen crush treatment, fine pulverization by a jet mill, molding, sintering, and aging treatment were performed to each composition.

As similar to Experiment 1, the results of compositional analysis of the R-T-B based sintered magnets of Experiments 5-1 to 5-8 are shown in Table 13. Also, the average grain size of the main crystal grains, the grain size distribution, the grain boundary phase coverage the area ratio of R-T-M phase, the area ratio of T-rich phase, and the area ratio of R-rich phase were evaluated and the results are shown in Table 14. Also, the results of measurements of the magnetic properties are shown in Table 15.

TABLE 13

| | Magnet composition (at %) | | | | | | | | | | | | |
|---|---|---|---|---|---|---|---|---|---|---|---|---|---|
| | Nd | Pr | Sm | Y | Ce | La | Fe | Co | B | Ga | Al | Cu | Zr |
| Experiment 5-1 | 8.68 | 0.00 | 0.89 | 3.95 | 1.97 | 1.97 | 75.06 | 0.56 | 4.61 | 1.47 | 0.66 | 0.07 | 0.09 |
| Experiment 5-2 | 8.65 | 0.00 | 0.89 | 3.93 | 3.93 | 0.00 | 75.12 | 0.56 | 4.62 | 1.46 | 0.66 | 0.07 | 0.10 |
| Experiment 5-3 | 8.69 | 0.00 | 0.89 | 3.95 | 0.00 | 3.95 | 75.12 | 0.56 | 4.54 | 1.47 | 0.66 | 0.06 | 0.10 |
| Experiment 5-4 | 0.00 | 8.65 | 0.89 | 7.87 | 0.00 | 0.00 | 75.13 | 0.56 | 4.62 | 1.46 | 0.66 | 0.06 | 0.10 |
| Experiment 5-5 | 13.82 | 0.00 | 1.83 | 0.89 | 0.44 | 0.44 | 75.20 | 0.55 | 4.62 | 1.38 | 0.66 | 0.07 | 0.09 |
| Experiment 5-6 | 13.88 | 0.00 | 1.84 | 0.89 | 0.89 | 0.00 | 75.21 | 0.55 | 4.55 | 1.38 | 0.66 | 0.06 | 0.10 |
| Experiment 5-7 | 13.83 | 0.00 | 1.83 | 0.89 | 0.00 | 0.89 | 75.26 | 0.55 | 4.55 | 1.36 | 0.66 | 0.07 | 0.10 |
| Experiment 5-8 | 0.00 | 13.87 | 1.84 | 1.78 | 0.00 | 0.00 | 75.15 | 0.55 | 4.62 | 1.36 | 0.66 | 0.07 | 0.09 |

TABLE 13-continued

|  | x | y | a/b | c/b | d/b | (a − 2c)/(b − 14c) | d/(b − 14c) |  |
|---|---|---|---|---|---|---|---|---|
| Experiment 5-1 | 0.051 | 0.452 | 0.23 | 0.061 | 0.019 | 0.75 | 0.133 | Example |
| Experiment 5-2 | 0.051 | 0.452 | 0.23 | 0.061 | 0.019 | 0.74 | 0.132 | Example |
| Experiment 5-3 | 0.051 | 0.452 | 0.23 | 0.060 | 0.019 | 0.69 | 0.121 | Example |
| Experiment 5-4 | 0.051 | 0.452 | 0.23 | 0.061 | 0.019 | 0.74 | 0.132 | Example |
| Experiment 5-5 | 0.105 | 0.102 | 0.23 | 0.061 | 0.018 | 0.74 | 0.125 | Example |
| Experiment 5-6 | 0.105 | 0.102 | 0.23 | 0.060 | 0.018 | 0.69 | 0.114 | Example |
| Experiment 5-7 | 0.105 | 0.102 | 0.23 | 0.060 | 0.018 | 0.69 | 0.113 | Example |
| Experiment 5-8 | 0.105 | 0.102 | 0.23 | 0.061 | 0.018 | 0.75 | 0.123 | Example |

TABLE 14

|  | Average crystal grain size D50 (μm) | Grain size distribution (D90 − D10)/D50 | Grain boundary phase coverage (%) | Area ratio of R-T-M phase (%) | Area ratio of T-rich phase (%) | Area ratio of R-rich phase (%) |  |
|---|---|---|---|---|---|---|---|
| Experiment 5-1 | 1.81 | 0.95 | 93.2 | 59.2 | 0.0 | 40.8 | Example |
| Experiment 5-2 | 1.81 | 0.95 | 93.5 | 60.3 | 0.0 | 39.7 | Example |
| Experiment 5-3 | 1.81 | 0.95 | 93.3 | 59.8 | 0.0 | 40.2 | Example |
| Experiment 5-4 | 1.81 | 0.94 | 93.8 | 65.7 | 0.0 | 34.3 | Example |
| Experiment 5-5 | 1.82 | 0.95 | 88.3 | 66.9 | 0.0 | 33.1 | Example |
| Experiment 5-6 | 1.82 | 0.95 | 88.5 | 67.0 | 0.0 | 33.0 | Example |
| Experiment 5-7 | 1.82 | 0.95 | 88.4 | 66.9 | 0.0 | 33.1 | Example |
| Experiment 5-8 | 1.82 | 0.94 | 89.2 | 66.7 | 0.0 | 33.3 | Example |

TABLE 15

|  | Minimum magnetizing field Hmag (kOe) | Remanence $Br\_{Hmag}$ (KG) | Coercivity $HcJ\_{Hmag}$ (kOe) | Squareness ratio $Hk\_{Hmag}/HcJ\_{Hmag}$ (%) | Minor curve flatness $H\_{50\% Js}/HcJ\_{Hmag}$ (%) | Rate of decrease of coercive force δ (%/° C.) | Rate of decrease of minor curve flatness ε (%/° C.) |  |
|---|---|---|---|---|---|---|---|---|
| Experiment 5-1 | 6.0 | 9.7 | 4.1 | 91.5 | 65.1 | 0.37 | 0.22 | Example |
| Experiment 5-2 | 6.0 | 9.6 | 4.3 | 91.5 | 65.2 | 0.37 | 0.22 | Example |
| Experiment 5-3 | 6.0 | 9.8 | 3.9 | 91.5 | 64.8 | 0.37 | 0.22 | Example |
| Experiment 5-4 | 7.0 | 9.6 | 4.2 | 91.7 | 67.9 | 0.39 | 0.23 | Example |
| Experiment 5-5 | 5.0 | 11.3 | 2.8 | 82.3 | 81.3 | 0.35 | 0.18 | Example |
| Experiment 5-6 | 5.0 | 11.1 | 2.9 | 82.3 | 81.2 | 0.35 | 0.18 | Example |
| Experiment 5-7 | 5.0 | 11.4 | 2.7 | 82.2 | 80.8 | 0.35 | 0.18 | Example |
| Experiment 5-8 | 5.0 | 11.5 | 3.0 | 81.8 | 81.5 | 0.37 | 0.19 | Example |

According to Table 15, the R-T-B based sintered magnets of Experiments 5-1 to 5-8 satisfied 7.0 kOe or less of the minimum magnetizing field, 9.5 kG or more of the remanence at the minimum magnetizing field, and 0.5 kOe or more and 5.0 kOe or less of the coercivity; and also had high squareness ratio and minor curve flatness at the minimum magnetizing field. Also, the rate of decrease of the coercivity and the rate of decrease of the minor curve flatness at high temperature were small.

Therefore, even in case elements other than Nd was selected as R1 and elements other than Y was selected as R2, a high remanence, a low coercivity, and high squareness ratio and minor curve flatness after magnetized in a low magnetizing field were attained. Furthermore, it was confirmed that the rate of decrease of the coercivity and the rate of decrease of the minor curve flatness at high temperature were small.

Hereinbefore, the present invention is described based on the embodiments. The present embodiments are examples and can be varied within the scope of the claims of the present invention. It is also understood by person in the art that such variations are within the scope of the claims of the invention. Therefore, description of the present specification is not limited thereto and is treated as an exemplification.

INDUSTRIAL APPLICABILITY

According to the present invention, the R-T-B based rare earth permanent magnet suitable for the variable magnetic force motor capable of maintaining a high efficiency in a wide rotational speed range can be provided.

NUMERICAL REFERENCES

1 . . . Main phase crystal grain
1' . . . Main phase crystal grain
2 . . . Grain boundary phase
3 . . . A part where an outline of the cross section of the main phase crystal grains contacts the grain boundary
4 . . . A part where an outline of the cross section of the main phase crystal grains contacts the main phase crystal grains

What is claimed is:

1. An R-T-B based rare earth permanent magnet represented by a compositional formula of $(R1_{1-x-y}Sm_x R2_y)_a T_b B_c M_d$, wherein R1 represents one or more rare earth elements which does not include Sm and R2, R2 represents one or more rare earth elements selected from Y, Ce, and La, T represents one or more transition metals essentially including Fe or a combination of Fe and Co, M represents Ga or a combination of Ga and one or more elements selected from Sn, Bi, and Si, x and y are on straight lines or in a pentagonal area surrounded by the straight lines formed by connecting point A (0.010, 0.600), point B (0.010, 0.400), point C (0.050, 0.000), point D (0.150, 0.000), and point E (0.100, 0.600) on (x, y) plane, a, b, c, and d satisfy relationships of $0.16 \leq a/b \leq 0.28$, $0.050 \leq c/b \leq 0.075$, and $0.005 \leq d/b \leq 0.028$, the R-T-B based rare earth permanent magnet includes grain boundary phases and a main phase comprising a compound having an $R_2T_{14}B$ based tetragonal structure, an average grain size D50 of main phase crystal grains of the main phase satisfies a relationship of D50≤4.00 μm, a grain size distribution satisfies a relationship of (D90−D10)/D50≤1.60, in which D10, D50, and D90 respectively represent an area circle equivalent diameter at 10%, 50%, and 90% in a cumulative distribution of a cross sectional area of the main phase crystal grains in an cross section of the R-T-B based rare earth permanent magnet, and a grain boundary phase coverage is 70.0% or more.

2. The R-T-B based permanent magnet according to claim 1, wherein a, b, c, and d satisfy relationships of $0.050 \leq c/b \leq 0.070$, $0.25 \leq (a-2c)/(b-14c) \leq 2.00$, and $0.025 \leq d/(b-14c) \leq 0.500$, in a cross section of the grain boundary phases, an area ratio of an R-T-M phase having $La_6Co_{11}Ga_3$ type crystal structure with respect to a total area of the grain boundary phases is 10.0% or more, an area ratio of a T-rich phase (a phase other than the R-T-M phase and satisfying [R]/[T]<1.0 when a number of atoms of R and T are represented by [R] and [T]) with respect to the total area of the grain boundary phases is 60.0% or less, and an area ratio of an R-rich phase (a phase satisfying [R]/[T]>1.0 when a number of atoms of R and T are represented by [R] and [T]) with respect to the total area of the grain boundary phases is 70.0% or less.

3. The R-T-B based rare earth permanent magnet according to claim 2, wherein y≥0.300.

4. The R-T-B based rare earth permanent magnet according to claim 2 wherein 0.000≤y≤0.111.

5. The R-T-B based rare earth permanent magnet according to claim 1, wherein y≥0.300.

6. The R-T-B based rare earth permanent magnet according to claim 1 wherein 0.000≤y≤0.111.

* * * * *